US011750618B1

(12) United States Patent
Vashisht et al.

(10) Patent No.: US 11,750,618 B1
(45) Date of Patent: Sep. 5, 2023

(54) SYSTEM AND METHOD FOR RETRIEVAL AND ANALYSIS OF OPERATIONAL DATA FROM CUSTOMER, CLOUD-HOSTED VIRTUAL RESOURCES

(71) Applicant: FireEye Security Holdings US LLC, Milpitas, CA (US)

(72) Inventors: Sai Vashisht, Morgan Hill, CA (US); Sumer Deshpande, Milpitas, CA (US); Sushant Paithane, Pune (IN); Rahul Khul, Pune (IN)

(73) Assignee: FireEye Security Holdings US LLC, San Jose, CA (US)

( * ) Notice: Subject to any disclaimer, the term of this patent is extended or adjusted under 35 U.S.C. 154(b) by 0 days.

(21) Appl. No.: 17/710,909

(22) Filed: Mar. 31, 2022

Related U.S. Application Data

(63) Continuation of application No. 16/557,512, filed on Aug. 30, 2019, now Pat. No. 11,310,238.

(60) Provisional application No. 62/824,300, filed on Mar. 26, 2019.

(51) Int. Cl.
H04L 9/40 (2022.01)
G06F 9/54 (2006.01)
G06F 9/50 (2006.01)

(52) U.S. Cl.
CPC .......... H04L 63/102 (2013.01); G06F 9/5077 (2013.01); G06F 9/54 (2013.01); H04L 63/0853 (2013.01)

(58) Field of Classification Search
None
See application file for complete search history.

(56) References Cited

U.S. PATENT DOCUMENTS

| 6,898,632 B2 | 5/2005 | Gordy et al. |
| 6,941,348 B2 | 9/2005 | Petry et al. |
| 7,080,407 B1 | 7/2006 | Zhao et al. |
| (Continued) | | |

FOREIGN PATENT DOCUMENTS

| GB | 2439806 A | 1/2008 |
| GB | 2490431 B | 3/2014 |
| (Continued) | | |

OTHER PUBLICATIONS

U.S. Appl. No. 16/557,512, filed Aug. 30, 2019 Non-Final Office Action dated Aug. 17, 2021.

(Continued)

Primary Examiner — Cai Y Chen
(74) Attorney, Agent, or Firm — Rutan & Tucker, LLP

(57) ABSTRACT

A system for protecting public cloud-hosted virtual resources features cloud visibility logic. According to one embodiment, the cloud visibility logic includes credential evaluation logic, data collection logic, correlation logic, and reporting logic. The credential evaluation logic is configured to gain authorized access to a cloud account within a first public cloud network. The data collection logic is configured to retrieve account data from the cloud account, while the correlation logic is configured to conduct analytics on the account data to determine whether the cloud account is subject to a cybersecurity threat or misconfiguration. The reporting logic is configured to generate an alert when the cloud account is determined by the correlation logic to be subject to the cybersecurity threat or misconfiguration.

22 Claims, 12 Drawing Sheets

(56) References Cited

U.S. PATENT DOCUMENTS

| | | |
|---|---|---|
| 7,080,408 B1 | 7/2006 | Pak et al. |
| 7,243,371 B1 | 7/2007 | Kasper et al. |
| 7,308,716 B2 | 12/2007 | Danford et al. |
| 7,448,084 B1 | 11/2008 | Apap et al. |
| 7,458,098 B2 | 11/2008 | Judge et al. |
| 7,467,408 B1 | 12/2008 | O'Toole, Jr. |
| 7,496,961 B2 | 2/2009 | Zimmer et al. |
| 7,519,990 B1 | 4/2009 | Xie |
| 7,540,025 B2 | 5/2009 | Tzadikario |
| 7,639,714 B2 | 12/2009 | Stolfo et al. |
| 7,698,548 B2 | 4/2010 | Shelest et al. |
| 7,779,463 B2 | 8/2010 | Stolfo et al. |
| 7,854,007 B2 | 12/2010 | Sprosts et al. |
| 7,937,387 B2 | 5/2011 | Frazier et al. |
| 7,949,849 B2 | 5/2011 | Lowe et al. |
| 8,006,305 B2 | 8/2011 | Aziz |
| 8,020,206 B2 | 9/2011 | Hubbard et al. |
| 8,045,458 B2 | 10/2011 | Alperovitch et al. |
| 8,069,484 B2 | 11/2011 | McMillan et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,291,499 B2 | 10/2012 | Aziz et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,438,644 B2 | 5/2013 | Watters et al. |
| 8,464,340 B2 | 6/2013 | Ahn et al. |
| 8,494,974 B2 | 7/2013 | Watters et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,239 B2 | 11/2013 | Aziz et al. |
| 8,635,696 B1 | 1/2014 | Aziz |
| 8,689,333 B2 | 4/2014 | Aziz |
| 8,713,681 B2 | 4/2014 | Silberman et al. |
| 8,776,229 B1 | 7/2014 | Aziz |
| 8,793,278 B2 | 7/2014 | Frazier et al. |
| 8,793,787 B2 | 7/2014 | Ismael et al. |
| 8,813,050 B2 | 8/2014 | Watters et al. |
| 8,832,829 B2 | 9/2014 | Manni et al. |
| 8,850,571 B2 | 9/2014 | Staniford et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,015,846 B2 | 4/2015 | Watters et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,906 B2 * | 4/2016 | Fry .................... H04L 63/0272 |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,749,343 B2 | 8/2017 | Watters et al. |
| 9,749,344 B2 | 8/2017 | Watters et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |

(56) References Cited

U.S. PATENT DOCUMENTS

| | | |
|---|---|---|
| 9,888,019 B1 | 2/2018 | Pidathala et al. |
| 9,892,261 B2 | 2/2018 | Joram et al. |
| 9,904,955 B2 | 2/2018 | Watters et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,063,583 B2 | 8/2018 | Watters et al. |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,548 B1 | 5/2019 | Aziz et al. |
| 10,284,574 B1 | 5/2019 | Aziz et al. |
| 10,284,575 B2 | 5/2019 | Paithane et al. |
| 10,296,437 B2 | 5/2019 | Ismael et al. |
| 10,335,738 B1 | 7/2019 | Paithane et al. |
| 10,341,363 B1 | 7/2019 | Vincent et al. |
| 10,341,365 B1 | 7/2019 | Ha |
| 10,366,231 B1 | 7/2019 | Singh et al. |
| 10,380,343 B1 | 8/2019 | Jung et al. |
| 10,395,029 B1 | 8/2019 | Steinberg |
| 10,404,725 B1 | 9/2019 | Rivlin et al. |
| 10,417,031 B2 | 9/2019 | Paithane et al. |
| 10,430,586 B1 | 10/2019 | Paithane et al. |
| 10,432,649 B1 | 10/2019 | Bennett et al. |
| 10,445,502 B1 | 10/2019 | Desphande et al. |
| 10,447,728 B1 | 10/2019 | Steinberg |
| 10,454,950 B1 | 10/2019 | Aziz |
| 10,454,953 B1 | 10/2019 | Amin et al. |
| 10,462,173 B1 | 10/2019 | Aziz et al. |
| 10,467,411 B1 | 11/2019 | Pidathala et al. |
| 10,467,414 B1 | 11/2019 | Kindlund et al. |
| 10,469,512 B1 | 11/2019 | Ismael |
| 10,474,813 B1 | 11/2019 | Ismael |
| 10,476,906 B1 | 11/2019 | Siddiqui |
| 10,476,909 B1 | 11/2019 | Aziz et al. |
| 10,491,627 B1 | 11/2019 | Su |
| 10,503,904 B1 | 12/2019 | Singh et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,523,609 B1 | 12/2019 | Subramanian |
| 10,528,726 B1 | 1/2020 | Ismael |
| 10,534,906 B1 | 1/2020 | Paithane et al. |
| 10,552,610 B1 | 2/2020 | Vashisht et al. |
| 10,554,507 B1 | 2/2020 | Siddiqui et al. |
| 10,565,378 B1 | 2/2020 | Vincent et al. |
| 10,567,405 B1 | 2/2020 | Aziz |
| 10,572,665 B2 | 2/2020 | Jung et al. |
| 10,581,874 B1 | 3/2020 | Khalid et al. |
| 10,581,879 B1 | 3/2020 | Paithane et al. |
| 10,581,898 B1 | 3/2020 | Singh |
| 10,587,636 B1 | 3/2020 | Aziz et al. |
| 10,587,647 B1 | 3/2020 | Khalid et al. |
| 10,592,678 B1 | 3/2020 | Ismael et al. |
| 10,601,848 B1 | 3/2020 | Jeyaraman et al. |
| 10,601,863 B1 | 3/2020 | Siddiqui |
| 10,601,865 B1 | 3/2020 | Mesdaq et al. |
| 10,616,266 B1 | 4/2020 | Otvagin |
| 10,621,338 B1 | 4/2020 | Pfoh et al. |
| 10,623,434 B1 | 4/2020 | Aziz et al. |
| 10,637,880 B1 | 4/2020 | Islam et al. |
| 10,642,753 B1 | 5/2020 | Steinberg |
| 10,657,251 B1 | 5/2020 | Malik et al. |
| 10,666,686 B1 | 5/2020 | Singh et al. |
| 10,671,721 B1 | 6/2020 | Otvagin et al. |
| 10,671,726 B1 | 6/2020 | Paithane et al. |
| 10,701,091 B1 | 6/2020 | Cunningham et al. |
| 10,706,149 B1 | 7/2020 | Vincent |
| 10,713,358 B2 | 7/2020 | Sikorski et al. |
| 10,713,362 B1 | 7/2020 | Vincent et al. |
| 10,715,542 B1 | 7/2020 | Wei et al. |
| 10,726,127 B1 | 7/2020 | Steinberg |
| 10,728,263 B1 | 7/2020 | Neumann |
| 10,735,458 B1 | 8/2020 | Haq et al. |
| 10,740,456 B1 | 8/2020 | Ismael et al. |
| 10,747,872 B1 | 8/2020 | Ha et al. |
| 10,757,120 B1 | 8/2020 | Aziz et al. |
| 10,757,134 B1 | 8/2020 | Eyada |
| 10,785,255 B1 | 9/2020 | Otvagin et al. |
| 10,791,138 B1 | 9/2020 | Siddiqui et al. |
| 10,795,991 B1 | 10/2020 | Ross et al. |
| 10,798,112 B2 | 10/2020 | Siddiqui et al. |
| 10,798,121 B1 | 10/2020 | Khalid et al. |
| 10,805,340 B1 | 10/2020 | Goradia |
| 10,805,346 B2 | 10/2020 | Kumar et al. |
| 10,812,513 B1 | 10/2020 | Manni et al. |
| 10,817,606 B1 | 10/2020 | Vincent |
| 10,826,931 B1 | 11/2020 | Quan et al. |
| 10,826,933 B1 | 11/2020 | Ismael et al. |
| 10,834,107 B1 | 11/2020 | Paithane et al. |
| 10,846,117 B1 | 11/2020 | Steinberg |
| 10,848,397 B1 | 11/2020 | Siddiqui et al. |
| 10,848,521 B1 | 11/2020 | Thioux et al. |
| 10,855,700 B1 | 12/2020 | Jeyaraman et al. |
| 10,868,818 B1 | 12/2020 | Rathor et al. |
| 10,872,151 B1 | 12/2020 | Kumar et al. |
| 10,873,597 B1 | 12/2020 | Mehra et al. |
| 10,887,328 B1 | 1/2021 | Paithane et al. |
| 10,893,059 B1 | 1/2021 | Aziz et al. |
| 10,893,068 B1 | 1/2021 | Khalid et al. |
| 10,902,117 B1 | 1/2021 | Singh et al. |
| 10,902,119 B1 | 1/2021 | Vashisht et al. |
| 10,904,286 B1 | 1/2021 | Liu |
| 10,929,266 B1 | 2/2021 | Goradia et al. |
| 11,310,238 B1 | 4/2022 | Vashisht et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |

(56) References Cited

U.S. PATENT DOCUMENTS

| | | |
|---|---|---|
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2003/0084318 A1 | 5/2003 | Schertz |
| 2003/0188190 A1 | 10/2003 | Aaron et al. |
| 2003/0191957 A1 | 10/2003 | Hypponen et al. |
| 2004/0015712 A1 | 1/2004 | Szor |
| 2004/0019832 A1 | 1/2004 | Arnold et al. |
| 2004/0117478 A1 | 6/2004 | Triulzi et al. |
| 2004/0117624 A1 | 6/2004 | Brandt et al. |
| 2004/0236963 A1 | 11/2004 | Danford et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0086523 A1 | 4/2005 | Zimmer et al. |
| 2005/0091513 A1 | 4/2005 | Mitomo et al. |
| 2005/0108562 A1 | 5/2005 | Khazan et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0238005 A1 | 10/2005 | Chen et al. |
| 2005/0262562 A1 | 11/2005 | Sassoway |
| 2005/0283839 A1 | 12/2005 | Cowburn |
| 2006/0010495 A1 | 1/2006 | Cohen et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0031476 A1 | 2/2006 | Mathes et al. |
| 2006/0070130 A1 | 3/2006 | Costea et al. |
| 2006/0117385 A1 | 6/2006 | Mester et al. |
| 2006/0123477 A1 | 6/2006 | Raghavan et al. |
| 2006/0150249 A1 | 7/2006 | Gassen et al. |
| 2006/0161987 A1 | 7/2006 | Levy-Yurista |
| 2006/0173992 A1 | 8/2006 | Weber et al. |
| 2006/0191010 A1 | 8/2006 | Benjamin |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0064689 A1 | 3/2007 | Shin et al. |
| 2007/0143827 A1 | 6/2007 | Nicodemus et al. |
| 2007/0157306 A1 | 7/2007 | Elrod et al. |
| 2007/0192858 A1 | 8/2007 | Lum |
| 2007/0208822 A1 | 9/2007 | Wang et al. |
| 2007/0240218 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2008/0005782 A1 | 1/2008 | Aziz |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0189787 A1 | 8/2008 | Arnold et al. |
| 2008/0307524 A1 | 12/2008 | Singh et al. |
| 2008/0320594 A1 | 12/2008 | Jiang |
| 2009/0003317 A1 | 1/2009 | Kasralikar et al. |
| 2009/0064332 A1 | 3/2009 | Porras et al. |
| 2009/0083855 A1 | 3/2009 | Apap et al. |
| 2009/0125976 A1 | 5/2009 | Wassermann et al. |
| 2009/0126015 A1 | 5/2009 | Monastyrsky et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0241190 A1 | 9/2009 | Todd et al. |
| 2009/0300589 A1 | 12/2009 | Watters et al. |
| 2010/0017546 A1 | 1/2010 | Poo et al. |
| 2010/0030996 A1 | 2/2010 | Butler, II |
| 2010/0058474 A1 | 3/2010 | Hicks |
| 2010/0077481 A1 | 3/2010 | Polyakov et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0167493 A1 | 7/2011 | Song et al. |
| 2011/0173213 A1 | 7/2011 | Frazier et al. |
| 2011/0178942 A1 | 7/2011 | Watters et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2012/0233698 A1 | 9/2012 | Watters et al. |
| 2012/0278886 A1 | 11/2012 | Luna |
| 2012/0331553 A1 | 12/2012 | Aziz et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0185795 A1 | 7/2013 | Winn et al. |
| 2013/0227691 A1 | 8/2013 | Aziz et al. |
| 2013/0232577 A1 | 9/2013 | Watters et al. |
| 2013/0247186 A1 | 9/2013 | LeMasters |
| 2013/0282426 A1 | 10/2013 | Watters et al. |
| 2013/0291109 A1 | 10/2013 | Staniford et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0297494 A1 | 10/2014 | Watters et al. |
| 2014/0337836 A1 | 11/2014 | Ismael |
| 2014/0344926 A1 | 11/2014 | Cunningham et al. |
| 2014/0366118 A1* | 12/2014 | Yin .................. H04L 67/1097 726/12 |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |

(56) References Cited

U.S. PATENT DOCUMENTS

| | | |
|---|---|---|
| 2016/0191550 A1 | 6/2016 | Ismael et al. |
| 2016/0241580 A1 | 8/2016 | Watters et al. |
| 2016/0241581 A1 | 8/2016 | Watters et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0323295 A1 | 11/2016 | Joram et al. |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0069891 A1 | 3/2018 | Watters et al. |
| 2018/0121316 A1 | 5/2018 | Ismael et al. |
| 2018/0288077 A1 | 10/2018 | Siddiqui et al. |
| 2019/0104154 A1 | 4/2019 | Kumar et al. |
| 2019/0132334 A1 | 5/2019 | Johns et al. |
| 2019/0207966 A1 | 7/2019 | Vashisht et al. |
| 2019/0207967 A1 | 7/2019 | Vashisht et al. |
| 2020/0184045 A1* | 6/2020 | Mills ......................... G06F 8/65 |
| 2020/0252428 A1 | 8/2020 | Gardezi et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

U.S. Appl. No. 16/557,512, filed Aug. 30, 2019 Notice of Allowance dated Dec. 13, 2021.

Venezia, Paul, "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.-mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.jsp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information". Proceedings of the 5th ACM workshop on Privacy in electronic society. ACM, 2006.

Baecher, "The Nepenthes Platform: An Efficient Approach to collect Malware", Springer-veriag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I., "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet URL:http://www.informationweek.com/microsofts-honeymonkeys-show-patching-windows-works/d/d-id/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

(56) References Cited

OTHER PUBLICATIONS

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Seiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., el al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

* cited by examiner

US 11,750,618 B1

SYSTEM AND METHOD FOR RETRIEVAL AND ANALYSIS OF OPERATIONAL DATA FROM CUSTOMER, CLOUD-HOSTED VIRTUAL RESOURCES

CROSS REFERENCE TO RELATED APPLICATIONS

This application is a continuation of U.S. patent application Ser. No. 16/557,512, filed Aug. 30, 2019, now U.S. Pat. No. 11,310,238 issued Apr. 19, 2022, which is based upon and claims the benefit of priority from U.S. Provisional Patent Application No. 62/824,300 filed Mar. 26, 2019, the entire contents of which are incorporated herein by reference.

FIELD

Embodiments of the disclosure relate to the field of network services. More specifically, one embodiment of the disclosure relates to a system configured to protect cloud-hosted resources.

GENERAL BACKGROUND

In the past, businesses have relied on application software installed on one or more electronic device residing in close proximity to its user (hereinafter, "on-premises electronic devices"). Each on-premises electronic device may constitute a type of computer such as a personal computer, a locally maintained mainframe, or a local server for example. Recently, however, more businesses and individuals have begun to rely on public cloud networks for their data computing and storage needs.

In general, a "public cloud network" is a collection of data centers, where each data center includes numerous servers and is hosted by a service provider. The data centers offer resources, such as virtual compute engines (e.g., virtual machines), application instances, and virtual data stores for example, which are available to the general public over the Internet. These resources may be free to the public or may be offered on a pay-per-usage basis. For instance, payments for data processing resources may be based on hourly compute time while payments for data storage resources may be based on the amount of storage being used (e.g., per megabyte, per gigabyte, etc.).

As a result, for a public cloud deployment, individuals are able to remotely access and utilize numerous services offered by a plurality of resources, including virtual compute engines that execute different types of applications and virtual persistent data storage. Examples of current public cloud networks may include, but are not limited or restricted to Amazon Web Services®, Microsoft Azure®, Google Cloud®, or the like (collectively referred to as the "cloud").

This growing migration to the cloud is due, in large part, to a number of advantages offered by the cloud. For instance, the cloud is a fully virtualized environment with a multi-tenant architecture that enables tenants (i.e., "customers") to establish different cloud accounts but share computing and storage resources. Data within each customer's cloud account, however, remains isolated from other customers. Hence, cloud-based services are ideal for businesses with growing or fluctuating resource demands, as the cloud capacity for virtual resources (e.g., compute power, data storage, etc.) is scalable and the usage-based cost structure does not require an entity to invest a large amount of capital in requisite hardware and/or software.

Additionally, unlike on-premises deployments, software updates and modifications for a customer are routinely handled by the cloud service provider without customer involvement. As a result, customers may realize labor and cost savings on network support expenditures. However, the lack of customer involvement in evaluating software updates and modifications to the virtual resources (e.g., application instances, virtual stored data, virtual compute engines, etc.) may pose significant risks, such as an increased risk of the customer's cloud account becoming compromised and/or an increased risk of cloud account setting misconfigurations caused by accident due to the increased complexity of public cloud networks or caused by unexpected setting changes.

Stated differently, given the rapid migration to public cloud networks, which are accessible by multiple users, there is now a growing tendency of cloud accounts (user accounts within the public cloud network) being subjected to attack and compromise. One type of attack is referred to as a "cyberattack," which constitutes a threat to the security and/or intended operability of a virtual resources offered as part of the cloud-host resources. The cyberattack may involve infiltration of content into data storage resources (e.g., a cloud storage service such as Amazon® S3), where the content may include one or more executables (e.g., scripts, one or more commands, programs, etc.) or one or more non-executables (e.g., modification of metrics or settings within stored files, etc.), each being designed to perpetrate unwanted, malicious or criminal activity. In addition to or in lieu of a cyberattack, cloud-hosted resources may experience certain operational issues that may occur through intentional or unintentional account misconfiguration, which may be caused by the user or the cloud service provider (e.g., abnormal configuration settings, unexpected transmission format setting changes such as disabling or enabling encryption, etc.).

Currently, there are no trusted third party schemes available for customers to effectively and easily analysis cloud accounts in efforts to detect whether cloud-hosted resources have been compromised or misconfigured accidentally or intentionally.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
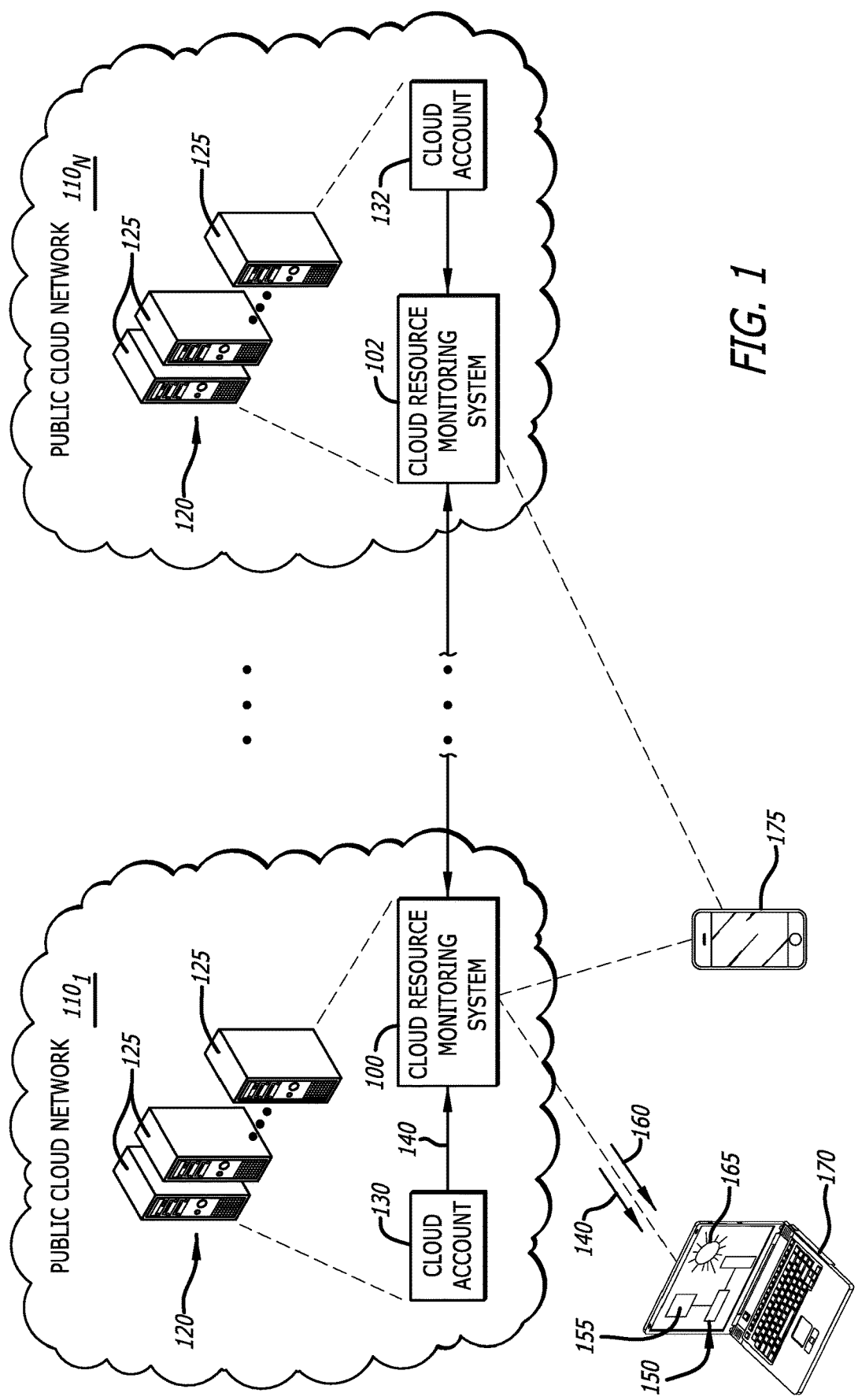
FIG. 1 is a block diagram of an exemplary embodiment a plurality of public cloud networks deploying cloud resource monitoring systems each configured to access specific customer cloud accounts, analyze information within these cloud accounts, aggregate information between cloud accounts in different public cloud networks, and report the analytic results therefrom.

Embodiments of the present disclosure generally relate to a cloud resource monitoring system that is configured to protect customer cloud-hosted resources within a public cloud network. Herein, cloud visibility logic, operating as part of the cloud resource monitoring system, may be configured to gain access to, ingest, and perform analytics on data from cloud-hosted resources specific to one or more cloud accounts for targeted customer(s). This "account data" may include operational log data or other types of meta-information. The analytics are conducted in order to identify whether a cloud account has been potentially compromised (e.g., potential cybersecurity threat) as well as any cloud account misconfigurations, whether intentional or unintentional. As a result, administrators and analysts may access a single location (e.g., display generated by the cloud resource monitoring system, and in particular, the cloud visibility logic) to review the security status of all cloud services provided within the cloud accounts.

Herein, the operational log data may include information that pertains to an event performed by a customer's cloud-hosted virtual resources. The "event" may correspond to an operation or a collection of operations conducted by one or more virtual resources of a (customer) cloud account, where the operation(s) cause a change of state in the cloud account's infrastructure. As an illustrative example, an event may include an Application Programming Interface (API) call that is intended to create, modify, or read data, where information associated with the API call is recorded and stored within an entry of an API log stored within the cloud account. The information within entries of the API log constitutes one type of operational log data. As another illustrative example, an event may include an operation performed by a virtual compute engine, where information associated with that operation (e.g., identifier of virtual compute engine, processing time, type of operation performed, results of the operation, etc.) is recorded and stored in one or more entries within another operational (compute) log. This information constitutes another type of operational log data.

Besides operational log data, the account data collected from the cloud account may include flow data. The flow data may include meta-information associated with the interconnectivity between virtual resources or other types of meta-information such as information directed to the software infrastructure of the cloud account.

During or after analytics are conducted on the account data, the cloud visibility logic may be further configured to provide a visualization of the infrastructure of the cloud account, which may allow an administrator to identify changes to the cloud-hosted resources by visual inspection of the cloud account infrastructure. These changes may indicate that one or more virtual resources associated with the cloud account under analysis has been compromised or misconfigured. In some embodiments, the visualization may be based on a comparison of different snapshots of cloud-hosted resources securely maintained within a data store within the cloud account. The similarities and/or differences may be used to identify certain types of events (e.g., resource changes, configuration changes, etc.) and provide a timeline as to the occurrence of these changes.

As a result, upon detecting that a virtual resource has been compromised or misconfigured, the cloud resource monitoring system allows for a retrospective review of that virtual resource. In particular, as the operational log data may be maintained for a prolonged duration (e.g., one year) within cloud or local (e.g., on-premises) storage, administrators may be able to gather historical operational data associated with compromised or misconfigured cloud-based virtual resource (e.g., Critical configuration/policy changes and user identification associated with the changes, time the compromise or misconfiguration occurred, responsible party, compliance violations, administrator at time of the compromise/misconfiguration, alerts generated, any remediation attempts as well as the time and successfulness of the remediation, etc.).

Based on the results of the analytics, the cloud visibility logic may control the reporting of the analytic results, which may include one or more dashboards that provide an administrator (e.g., person responsible for managing the customer cloud-hosted resources or the public cloud network itself) access to alerts. Additionally, for compliance with certain cloud policies, upon detection of a potential cybersecurity threat and/or misconfiguration, the cloud visibility logic may initiate actions to remediate the detected cybersecurity threat and/or misconfiguration through blocking, resetting of configuration settings, or the like.

As a collective summary, the cloud resource monitoring system is responsible for monitoring and protecting the customer cloud account(s) against attack and/or misconfiguration. As described herein, the cloud resource monitoring system may be provided as (i) logic (e.g., a piece of software such as an instance) deployed within a protected customer cloud account (FIGS. 5A-5B) or logic maintained within virtual resources separate from the customer cloud account (e.g., virtual resources within the public cloud network that are maintained by the network provider or a third party (FIG. 2)). As another alternative embodiment, in lieu of deployment within the public cloud network, the cloud resource monitoring system may be implemented within an on-premises electronic device. For this embodiment, the cloud resource monitoring system may be configured to establish communications with one or more public cloud networks to access customer cloud account(s), and then, collect data (e.g., operational log data) from the customer cloud account(s) for storage within one or more data stores maintained within the on-premises electronic device or another electronic device. As yet another embodiment, a hybrid deployment may be utilized in which data collection logic of the cloud visibility logic is maintained at the public cloud network while data analytics logic of the cloud visibility logic is maintained at the on-premises electronic device.

In monitoring and protecting customer cloud account(s), the cloud resource monitoring system, in particular its cloud visibility logic, may be configured to (i) gain authorized access to a particular customer's cloud account; (ii) collect data (e.g., meta-information including operational log data) from virtual data stores pertaining to the accessed cloud account; (iii) generate a display that visualizes the infrastructure of the accessed cloud account with display elements corresponding to virtual resources within the accessed cloud account that, upon selection, may provide greater granularity as to the properties and operations associated with these virtual resources; (iv) perform analytics of the collected data to determine a presence of any cybersecurity threats or account misconfigurations; and/or (v) perform activities to alert one or more administrators of the analytic results and/or to conduct any remediation, if desired. Additionally, the cloud resource monitoring system may be configured to aggregate its analytic results with results from multiple (two or more) cloud accounts to generate a single display (dashboard) to visually depict the presence of any potential cybersecurity threats or misconfigurations for cloud accounts from multiple different public cloud networks. Additionally, or in the alternative, the cloud resource monitoring system may be configured to retrieve and aggregate data (e.g., operational log data) received from cloud accounts residing in different public cloud networks, perform analytics on the aggregated data, and generate a display (dashboard) to visually depict the presence of any potential cybersecurity threats or misconfigurations for any of these cloud accounts.

According to one embodiment of the disclosure, the cloud resource monitoring system may be configured to obtain authorized access to a particular customer's cloud account in a public cloud network using any of a number of authentication schemes. For example, one authentication scheme may feature a web user interface (UI) portal that is made available after selection by a customer of the cloud resource monitoring system offered by a public cloud network provider or a third party.

More specifically, the web UI portal or command line interface (CLI) is provided to receive credentials from the customer in order to get access token. The credentials are made available to the cloud visibility logic, which may be configured to communicate the customer credentials to access control logic for the public cloud network. Upon successful customer authentication, access token is returned to the cloud visibility logic. The access token enable the cloud visibility logic to commence a communication (monitoring) session to gain authorized access to content within the customer's cloud account(s). The access token may identify specific virtual resources to which the cloud visibility logic is provided access or may provide account-wide access to data therein. Alternatively, a Security Token Service (STS) may be deployed within the public cloud network to generate access token through a web service that generates, upon request, temporary, limited-privilege credentials (access tokens) for use by the cloud visibility logic managed by authenticated users (e.g. Amazon Web Service "AWS" Identity and Access Management "IAM" users) or other authorized users.

Once granted authorization, according to one embodiment of the disclosure, the cloud visibility logic may collect data (e.g., operational log data acquired and/or generated during the processing of software components by virtual compute engines allocated to the customer's cloud account) stored within one or more virtual data stores allocated to that cloud account. Alternatively, according to another embodiment of the disclosure, the cloud visibility logic may acquire the above-described collected data from the customer's cloud account, but the collected data may be stored within one or more virtual data stores assigned to a different cloud account.

As described above, the cloud visibility logic may perform analytics on the collected data to detect a cybersecurity threat and/or cloud account misconfiguration. According to one embodiment of the disclosure, the analytics may involve one or more analyses of the collected data (e.g., operational log data, etc.), which are conducted in accordance with a plurality of rules that are chosen to identify an occurrence of one or more unexpected, abnormal or inconsistent events. The analyses may involve a matching of events associated with the collected data with patterns of known suspicious events such as patterns of known malicious events or patterns of events (e.g., activities) previously used by hackers to misconfigure and compromise a cloud account or services within the cloud account (hereinafter "compromising events), which may involve an initial temporal analysis being conducted to place these suspicious events in some sort of chronological order based on time of occurrence. Additionally, or in the alternative, the analyses may involve a comparison of the current snapshot of the state of the cloud account against the prior snapshots. Thereafter, an analysis is conducted on the differences between these snapshots to determine changes in the cloud account. For both of these analyses, the cloud visibility logic operates to determine potential issues, such as cybersecurity threats or misconfigurations, both intentional misconfigurations as part of a cybersecurity attack or accidental misconfigurations, that may be causing the virtual resources for an account to operate incorrectly, inconsistently, or in a less than optimal manner.

Besides detecting potential issues as described above, the cloud visibility logic is configured to analyze the collected data retrieved from operational logs by at least determining characteristics shared by different operational log data (e.g., common sources, activity or activities that caused generation of the operational logic data, etc.). The collected data is further analyzed to learn relationships amongst the operational log data, which may generate additional meta-information for use in the analytics of the collected operational log data. This additional meta-information may be aggregated and correlated with known patterns of malicious activity or compromising activity via configuration changes (e.g., settings, permissions, etc.) to further assist in determining a cybersecurity threat or account misconfiguration.

Determination of a cybersecurity threat or account misconfiguration may be further established by the cloud visibility logic correlating the collected data associated with the one or more cloud accounts with heuristic information such as cybersecurity threat information from other systems or third-party systems (e.g., machine generated intelligence, post-intrusion intelligence, pre-attack intelligence, etc.). Other examples of heuristic information may include, but is not limited or restricted to expected account configuration setting and/or configuration setting misconfigurations that have been determined to be more susceptible to cybersecurity attack or adversely affect operability of certain virtual resources.

The collective analytics on the heuristic information and the collected data, as described above, may generate a score that denotes a presence of a cybersecurity threat or an account misconfiguration. In some embodiments, known cybersecurity threats may be mitigated through a prescribed mitigation scheme.

If cybersecurity threat or account misconfiguration is detected, an alert may be generated and issued to one or more administrators. If a prescribed mitigation scheme exists to remediate a detected cybersecurity threat or account misconfiguration, the cloud management system may generate an alert for an administrator and provide the prescribed mitigation scheme, which may be triggered automatically or may be controlled by an administrator (e.g., selecting a radio button or link to provide further information of the threat/misconfiguration and potential mitigation processes available). The alerts and/or prescribed mitigation scheme may be configured in accordance with a set of regulatory compliance rules associated with, for example, regulatory compliance (e.g., Health Insurance Portability and Accountability Act (HIPAA), Payment Card Industry Data Security Standard (PCI DSS), etc.).

I. Terminology

In the following description, certain terminology is used to describe aspects of the invention. In certain situations, the terms "logic" and "engine" are representative of hardware, firmware, and/or software that is configured to perform one or more functions. As hardware, the logic (or engine) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or engine) may be software in the form of one or more software modules. The software modules may include an executable application, a daemon application, an application programming interface (API), a subroutine, a function, a procedure, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or engine) may be stored in persistent storage.

The term "electronic device" should be generally construed as electronics with data processing capability and/or a capability of connecting to any type of network, such as a public cloud network (e.g., Amazon Web Service (AWS®), Microsoft Azure®, Google Cloud®, etc.), a private cloud network, or any other network type. Examples of an electronic device may include, but are not limited or restricted to, the following: a server, a mainframe, a firewall, a router or other intermediary communication device, or an endpoint device (e.g., a laptop, a smartphone, a tablet, a desktop computer, a netbook, gaming console, etc.).

The term "meta-information" generally refers to a collection of information that is descriptive of characteristics of a certain portion of information to which the meta-information pertains. For example, the meta-information may identify the portion of information for purposes of discovery and/or identification. As another example, the meta-information may identify structural or administrative characteristics for the portion of information such as (1) data type, (2) version, (3) relationships to other information, (4) access history or controls (e.g., permissions, access content directed to user/time/source, etc.), (5) creation or modification history (e.g., when portion of information created or modified, when/what processes created from the information, etc.), or the like.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMES SAGE; Instant Message Access Protocol (IMAP); or the like. Hence, each message may be in the form of one or more packets, frames, or any other series of bits having the prescribed, structured format.

The term "computerized" generally represents that any corresponding operations are conducted by hardware in combination with software and/or firmware.

As described herein, a cloud management system may be deployed as a "cloud-based hosted service," a "hosted service," or a combination thereof, any of which operates to protect customer cloud-hosted resources maintained within a public cloud network. A cloud-based hosted service may be configured to operate as a multi-tenant service; namely a service made available to tenants (also referred to as "customers") on demand via a public network (e.g., Internet). The multi-tenant service may feature virtual resources, such as virtual compute engines and/or virtual data stores for example, which are partitioned for use among the customers in accessing and/or analyzing data maintained within that customer's specific cloud account. The partitioning protect the security and privacy of the customer data. A "hosted service" may be configured as a single-tenant service provided by a customer's own on-premises server(s) to access and collect meta-information from that customer's cloud accounts(s). Examples of a hosted service may include, but is not limited or restricted to a Microsoft® Exchange® server, a file repository, or the like.

In certain instances, the terms "compare," "comparing," "comparison," or other tenses thereof generally mean determining if a match (e.g., identical or a prescribed level of correlation) is achieved between meta-information associated with two items under analysis.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Cloud Management System Deployments

Referring to FIG. 1, a block diagram of an exemplary embodiment of a cloud resource monitoring system 100 operating in cooperation with one or more public cloud networks $110_1$-$110_N$ (N≥1) to access and analyze content within specific user accounts deployed in the public cloud network(s) is shown. Each of the public cloud networks $110_1$-$110_N$ (e.g., Microsoft Azure®, or Amazon Web Services®, or Google Cloud®, etc.) is a fully virtualized, multi-tenant service made available through one or more data centers 120. As shown, with respect to a first public cloud network $110_1$ for example, the data center(s) 120 may include a plurality of servers 125 maintained by a provider of the first public cloud network $110_1$. The servers 125 include logic, operating as virtual resources, which are offered by the first public cloud network $110_1$ and made available to the general public over the Internet.

Herein, the operations of the cloud resource monitoring system 100 (deployed within the first public cloud network $110_1$) are directed to gaining authorized access to information within a cloud account 130 associated with a specific tenant (hereinafter referred to as a "customer"), where the accessing entity is different than the customer. The cloud account 130 corresponds to a collection of virtual resources allocated to the customer, where the cloud account 130 is hosted at a public cloud network (e.g., the first public cloud network $110_1$).

It is contemplated that multiple (two or more) cloud accounts 130 and 132 for a particular customer may be hosted at different public cloud networks (e.g., the first public cloud network $110_1$ and $N^{th}$ public cloud network $110_N$). For this deployment, the cloud resource monitoring system 100 is configured to monitor/protect customer cloud-hosted resources of and operate within the first public cloud network $110_1$ while another cloud resource monitoring system 102 may be configured to monitor/protect customer cloud-hosted resources of and operate within the $N^{th}$ public cloud network $110_N$. For simplicity, the cloud resource monitoring management services described herein will focus on the operability of the cloud resource monitoring system 100 installed within the first public cloud network $110_1$.

After gaining access to the customer's cloud account 130, the cloud resource monitoring system 100 may be configured to collect account data 140 (referred to as "collected data 140") from the accessed cloud account 130 (e.g., operational log data, meta-information directed to virtual resources being utilized within the cloud account 130 such as virtual compute engines or virtual data stores, etc.). According to one embodiment of the disclosure, a portion of the collected data 140 may be used in the generation of a display 150, which visualizes the infrastructure of the accessed cloud account 130. The visualized infrastructure may be represented by a plurality of display elements 155, each corresponding to a virtual resource within the accessed cloud account 130. In response to selection of one of the display elements 155, the cloud resource monitoring system 100 provides access to additional portions of the collected data 140 in order to provide greater granularity as to the properties of the virtual resources associated with the selected display element.

Besides visualization of the cloud account 130, the cloud resource monitoring system 100 may be configured to perform analytics on the collected data 140 to determine a presence of any cybersecurity threats and/or misconfigurations. Based on this determination, the cloud resource monitoring system 100 generates alerts 160 to one or more administrators. The alerts 160 may include a portion of the analytic results and/or logic to mitigate or remediate any cybersecurity threats and/or misconfigurations. Content 165 from the alerts 160 may be rendered for display and further evaluation by an administrator.

As further shown in FIG. 1, the cloud resource monitoring system 100 may be configured to aggregate its analytic results with results from cloud resource monitoring system 102 to generate a single display (dashboard) to visually illustrate the presence of any potential cybersecurity threats or misconfigurations for cloud accounts 130, 132 from public cloud networks $110_1$, $110_N$. Additionally, or in the alternative, the cloud resource monitoring system 100 may be configured to retrieve and aggregate account data from cloud accounts 130, 132 residing in different public cloud networks $110_1$, $110_N$ (e.g., collected (account) data 140 along with account data received from the cloud account 132), perform analytics on the aggregated data, and generate a display (dashboard) on an electronic device (e.g., laptop 170 and/or smartphone 175) to visually illustrate the presence of any potential cybersecurity threats or misconfigurations for any of these cloud accounts 130 and/or 132. As a result, the cloud resource monitoring system 100 provides a scalable cloud security solution with rule-based analytics to provide visibility as to the security status of all cloud accounts (and services associated with these accounts) with retention and reporting of operational log data and audit compliance data.

Figure 2:
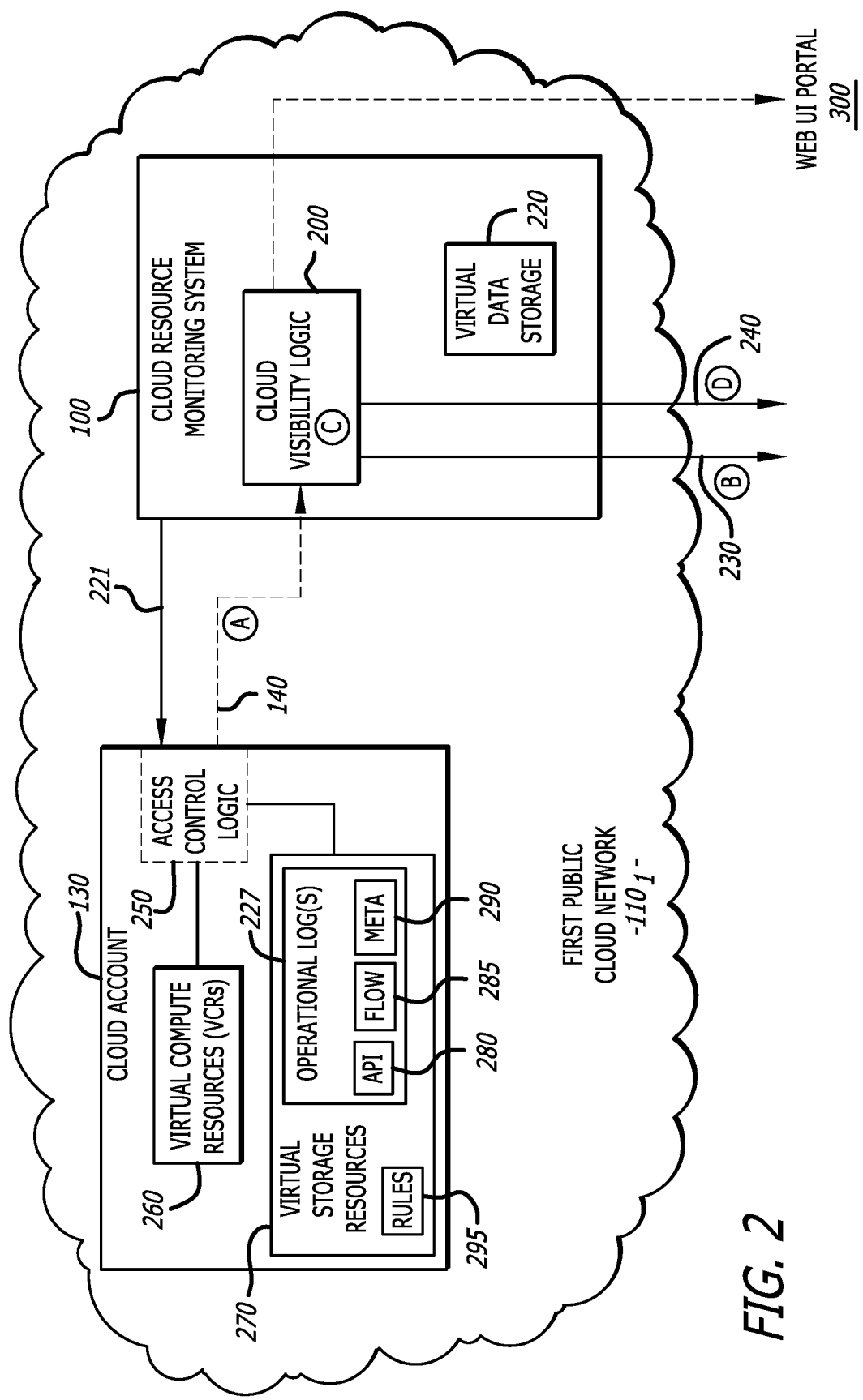
FIG. 2 is an exemplary embodiment of virtual resources within the first public cloud network of FIG. 1 including the cloud resource monitoring system including cloud visibility logic interacting with virtual resources within a cloud account.

Referring now to FIG. 2, a first exemplary embodiment of virtual resources within the first public cloud network $110_1$ of FIG. 1 is shown, where the cloud resource monitoring system 100 operates as an independent, cloud-based hosted service that may handle cloud accounts for different customers. As shown, the cloud resource monitoring system 100 may be installed as a free or subscription-based services on the first public cloud network $110_1$ by the cloud provider or a third-party source.

The cloud resource monitoring system 100 includes cloud visibility logic 200, namely logic that is configured to gain authorized access to the customer's cloud account 130, and once authorized access is secured, retrieve the collected data 140 (e.g., meta-information including operational log data) associated with the accessed cloud account 130 (operation A). Based on the collected data 140, the cloud visibility logic 200 is configured to (i) generate a representation 230 (operation B) that visualizes an infrastructure of the assessed cloud account 130 based on the collected data 140, (ii) perform analytics of the collected data 140 (operation C) to determine a presence of any cybersecurity threats or (setting) misconfigurations, and/or (iii) generate alerts 240 that are made available to one or more administrators of the analytic results (operation D). The alerts 240 may include messages with the analytic results and/or information for use in performing remediation activities including reverting a defined policy of operation for all or specific virtual resources utilized by the cloud account 130 under analysis, which is established through one or more settings or rules, to a default or predetermined configuration, if desired.

Herein, the cloud visibility logic 200 may be configured to secure authorized access to a particular customer's cloud account in a public cloud network using any of a number of authentication schemes. For example, one authentication scheme may feature a web user interface (Web UI) portal 300 of FIG. 3, which may be utilized at initial set-up in registration for monitoring services offered by the cloud resource monitoring system 100 or when the cloud visibility logic 200 determines that is not maintaining valid access tokens to gain authorized access to content within the cloud account 130 (e.g., authentication time period for the access token has expired, access token has been revoked, etc.).

Figure 3:
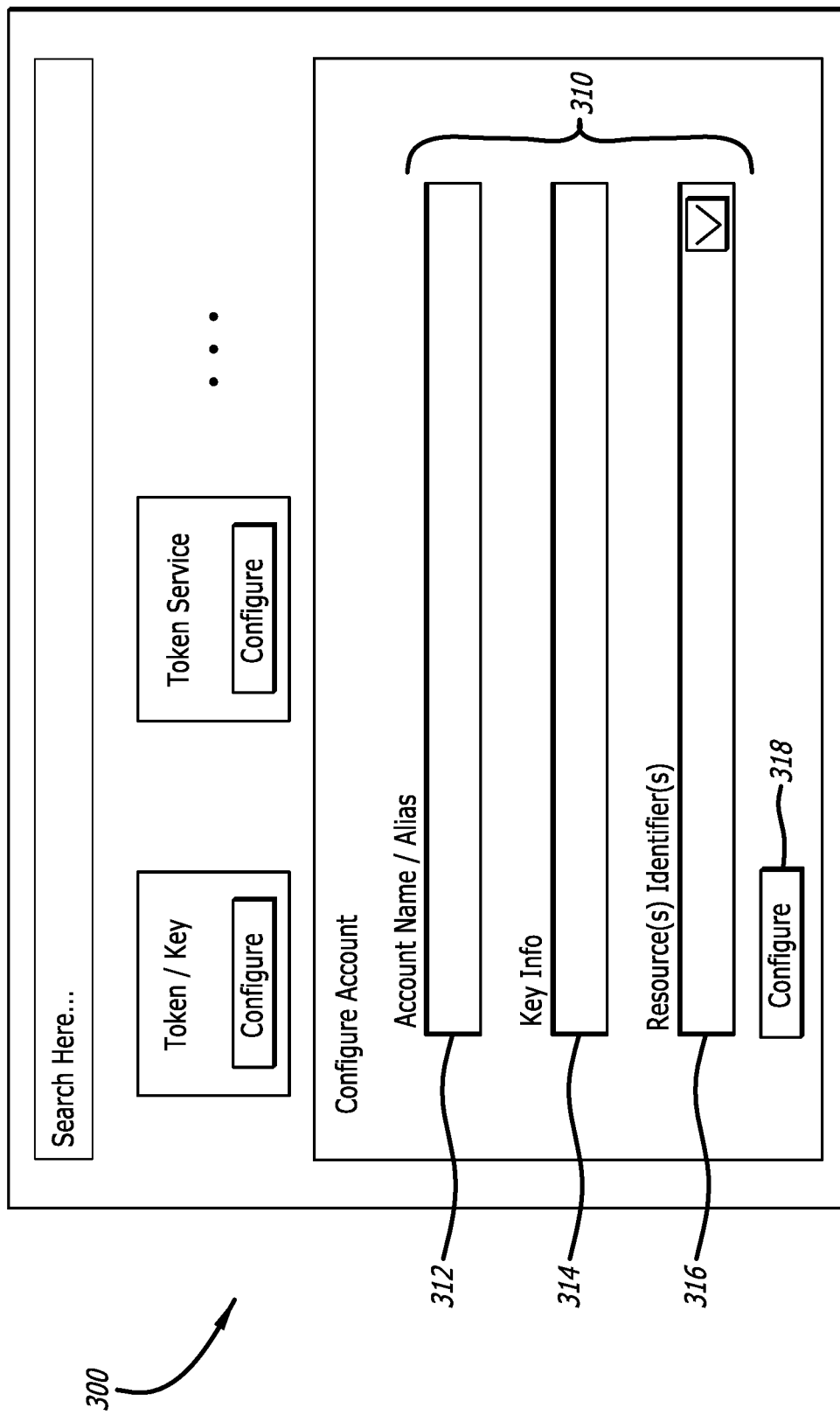
FIG. 3 is an exemplary embodiment of a user interface portal (Web UI) that is generated during customer registration to provide access permissions of account resources to the cloud visibility logic.

As shown in FIG. 3, according to one embodiment of the disclosure, the Web UI portal 300 includes a plurality of entries 310. A first entry 312 may be reserved to receive an identifier for the cloud account 130 (e.g., account name, alias, etc.). Other entries 314 of the plurality of entries 310 may include access controls such as one or more keys (e.g., session keys, etc.), password(s), or the like. An optional entity 316 may include an identifier of a particular resource or resources in the public cloud network $110_1$ to which the access token permits access. A customer credential is generated upon placing access control parameters into entries 310 and selecting the "Configure" area 318 and is provided to access control logic 250, which may reside as a virtual resource as part of the cloud account 130 as shown in FIG. 2 or as a separate service (not shown). The customer credential may be temporarily stored in the virtual data storage 220, perhaps until receipt of an access credential (token) 221 generated by and received from the access control logic 250.

Referring still to FIG. 2, once granted authorization to access the cloud account 130 (i.e., cloud resource monitoring system 100 currently maintains a valid access token 221 for the cloud account 130), according to one embodiment of the disclosure, the cloud visibility logic 200 may provide the access token 221 to the access control logic 250, which permits access to content within the cloud account 130. Thereafter, the cloud visibility logic 200 may accumulate the collected data 140, namely account data such as operational log data and/or other meta-information for example. The operational log data and/or other meta-information, forming the collected data 140, may be accumulated during the processing of software components by virtual compute resources 260 (e.g., one or more virtual compute engines each based on operability of a hardware processor and allocated to the cloud account 130) and maintained within virtual storage resources 270 (e.g., one or more virtual data stores each operating as non-transitory storage medium allocated to the cloud account 130). Additionally, the software components may be stored within the virtual storage resources 270 allocated to the cloud account 130. As an alternative, the cloud visibility logic 200 may collect the account data 140, but this collected data 140 may be stored within one or more virtual data stores (not shown) outside of the memory allocated to the cloud account 130.

As described above, the cloud visibility logic 200 may perform analytics on the collected data 140 (e.g., operational log data, meta-information associated with certain virtual resources, etc.) to detect a cybersecurity threat and/or cloud account misconfiguration. According to one embodiment of the disclosure, the analytics may involve one or more analyses of operational log data (e.g., content 280 from API logs, flow data 285 identifying which users are connecting to virtual private clouds being part of the cloud account 130, meta-information 290 directed to settings of the virtual compute engines within the virtual compute resources 260, etc.), which are conducted by one or more virtual compute engines 260 operating in accordance with a plurality of rules, such as correlation rules 295 that are configured to identify an occurrence of suspicious events (e.g., one or more unexpected, abnormal or inconsistent events) or regulatory compliance rules to verify compliance with governmental or other regulations regarding data acquisition and/or retention. The analyses may involve a matching of events associated with the collected data 140 with patterns of known suspicious events, which may involve an initial temporal analysis being conducted to order these events based on time of occurrence.

Additionally, or in the alternative, the analyses may involve a comparison of the current snapshot of the state of the cloud account 130 against prior snapshots. Thereafter, an analysis is conducted on the differences between these snapshots to determine changes in the cloud account 130. For both of these analyses, the cloud visibility logic 200 operates to determine potential issues, such as cybersecurity threats or misconfigurations that may be causing the virtual resources for the cloud account 130 to operate incorrectly, inconsistently, or in a less than optimal manner. As yet another analysis (or alternative analysis), although not shown, a determination of a cybersecurity threat may be further established by correlating additional meta-information collected by the cloud visibility logic 200 with other intelligence such as data pertaining to suspicious events associated with cybersecurity threats (malicious events) and/or account misconfigurations received from other sources (e.g., third party intelligence, post-intrusion intelligence, pre-attack intelligence). The correlation of the analytic results from one or more of these analyses may correspond to a threat/misconfiguration score that denotes a threat or misconfiguration upon exceeding a prescribed threshold.

If cybersecurity threat or account misconfiguration is detected by the cloud visibility logic 200, the alert 240 may be generated and issued to one or more administrators. The alert 240 may include information that, once received and rendered in a displayable format, represents the events (e.g., activities) that led to the cybersecurity threat or account misconfiguration. The alert 240 may allow for the customer's administrator to conduct a retrospective review of activities associated with a particular virtual resource or a particular group of virtual resources over a prescribed duration, based on historical operational data associated with compromised or misconfigured cloud-based virtual resource.

Additionally, the alert 240 may include a prescribed mitigation scheme to remediate the cybersecurity threat or account misconfiguration, which may be triggered automatically or by the administrator (e.g., selecting a radio button or link to provide further information of the threat/misconfiguration and potential mitigation processes available). The alert 240 and/or prescribed mitigation scheme may be configured in accordance with a set of regulatory compliance rules associated with, for example, regulatory compliance (e.g., Health Insurance Portability and Accountability Act (HIPAA), Payment Card Industry Data Security Standard (PCI DSS), etc.).

Figure 4A:
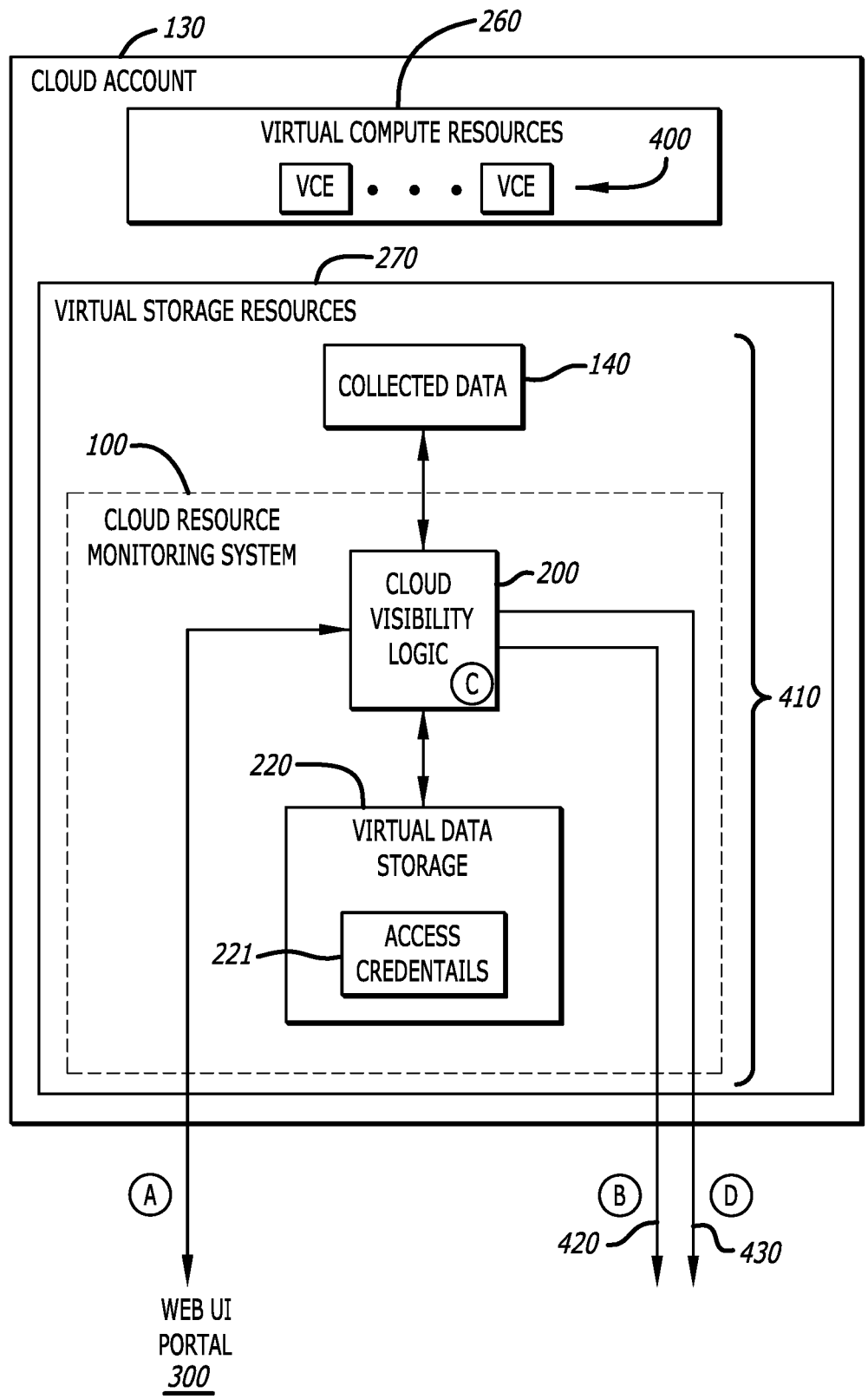
FIG. 4A is an exemplary embodiment of virtual resources within the first public cloud network of FIG. 1 including the cloud visibility logic being part of the cloud resource monitoring system installed within a customer's cloud account.

Referring to FIG. 4A, a second exemplary embodiment of virtual resources within the first public cloud network 110₁ of FIG. 1 is shown, where the cloud resource monitoring system 100 is installed within a customer's cloud account 130. The cloud resource monitoring system 100 includes the cloud visibility logic 200, which is configured to gain authorized access to resources within the customer's cloud account 130. For example, the cloud visibility logic 200 may retrieve the collected data 140, namely operational log data and/or other meta-information for example, which may be generated during the processing of software components by virtual compute engines (VCEs) 400 of the virtual compute resources 260 and/or stored within one or more virtual data stores 410 of the virtual storage resources 270. The collected data 140 may be subsequently stored within the virtual data storage 220 allocated for use by the cloud resource monitoring system 100.

Once authorized access is secured (e.g., in possession of valid access tokens 221 to specific virtual resources), the cloud visibility logic 200 is configured to retrieve account data, including meta-information such as operational log data associated with or maintained by those specific virtual resources. As shown, in lieu of providing access tokens 221 outside of the cloud account 130, for this embodiment, the access tokens 221 are maintained within the cloud account 130 based on communications initiated by the UI web portal 300 of FIG. 3 (operation A).

Operating in a manner similar to a deployment external to the cloud account 130 as illustrated in FIG. 2, the cloud visibility logic 200 may be configured to (i) generate a representation 420 (operation B) to visualize an infrastructure of the cloud account 130 based on the collected data 140, (ii) perform analytics of the collected data 140 (operation C) to determine a presence of any threats or misconfigurations, and (iii) perform activities to generate alerts 430 that are made available to one or more administrators of the analytic results (operation D). The alerts 430 may include messages with the analytic results and/or information for use in performing remediation activities, as described above.

Although not shown, the cloud visibility logic 200 may establish communications with other cloud accounts within the public cloud network 110₁ in which cloud account 130 resides, or with other cloud accounts in a different public cloud network, such as cloud account 132 residing in public cloud network 110ₙ of FIG. 1. The cloud visibility logic 200 may be configured to generate another visualization of the infrastructure of the cloud account 132 based on the collected operational log data or other meta-information, perform analytics of the collected operational log data or other meta-information to determine a presence of any cybersecurity threats or account misconfigurations, and include the analytics and/or visualization within the downloaded data provided via the alerts 430.

Figure 4B:
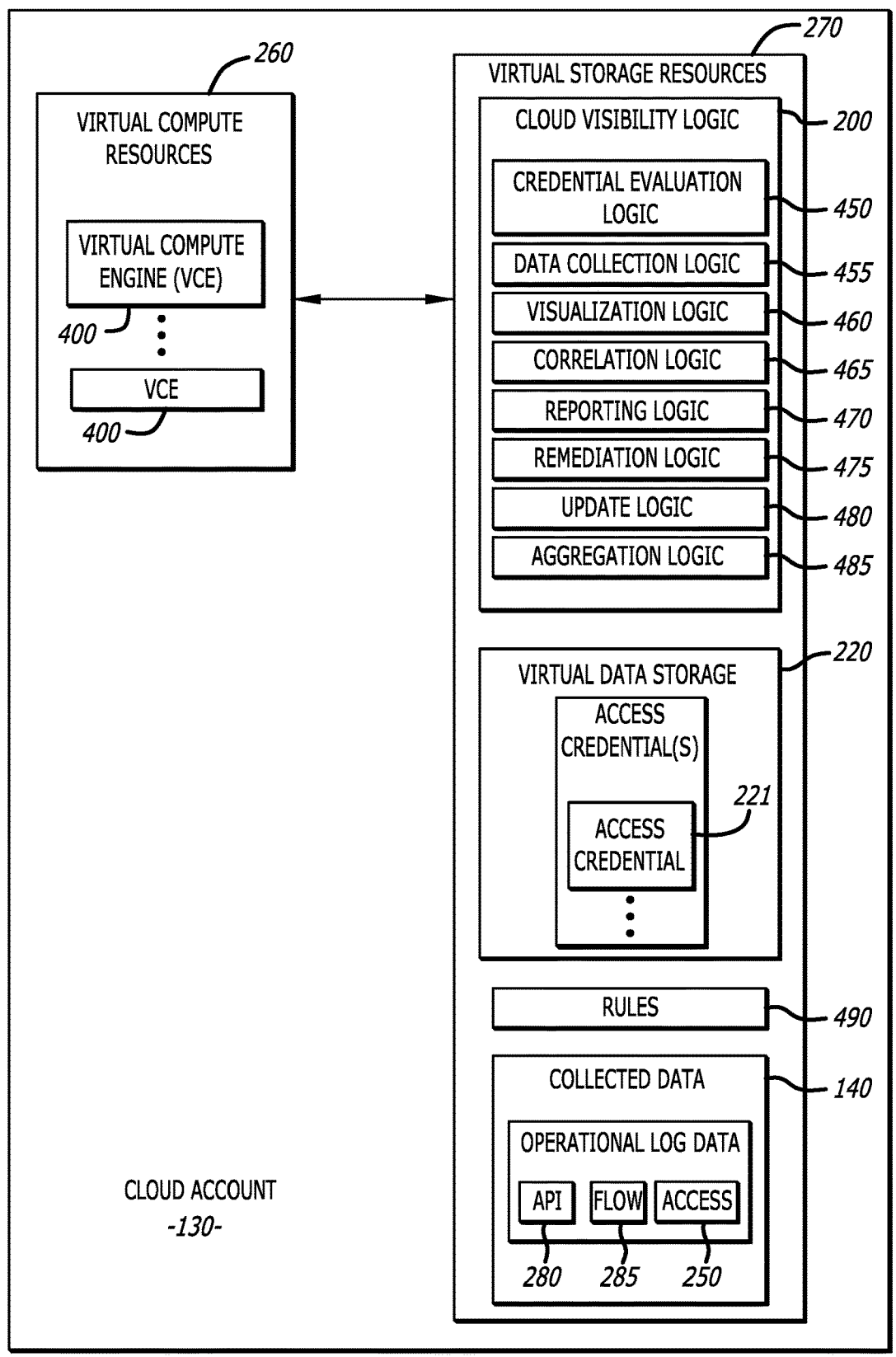
FIG. 4B is an exemplary embodiment of cloud visibility logic of FIG. 4A along with its operability with virtual resources within the cloud account.

Referring now to FIG. 4B, an exemplary embodiment of virtual resources within the cloud visibility logic 200, as illustrated of FIG. 4A as well as FIG. 2 (above) is shown. Herein, virtual compute resources 260 are configured to process software components maintained within the virtual storage resources 270, including the cloud visibility logic 200. In particular, the virtual compute resources 260 may include one or more virtual compute engines 400, namely processor instances that are configured to execute software components of the cloud visibility logic 200 stored within the virtual storage resources 270. Examples of software components forming the cloud visibility logic 200 may include, but are not limited or restricted to credential evaluation logic 450, data collection logic 455, visualization logic 460, correlation logic 465, reporting logic 470, remediation logic 475, update logic 480 and aggregation logic 485.

Herein, when executed by one or more virtual compute engine 400 included as part of the virtual compute resources 260, the credential evaluation logic 450 is configured to determine whether the cloud visibility logic 200 is permitted access content from the cloud account 130. This determination may be based on an internal check as to whether the stored access token 221 is valid and may be used by the cloud visibility logic 200 to gain access to content within the cloud account 130. If the access token 221 is not valid (e.g., expired, revoked, etc.), the credential evaluation logic 450 is further configured to select a particular authentication operation to be performed to obtain the valid access token. For instance, a detected lack of a valid access token may prompt the credential evaluation logic 450 to provide a web UI portal 300 of FIG. 3, which allows for entry of access control parameters (credentials) that may be either (i) authenticated to prompt return of a valid access token or (ii) used, either collectively or in part, to form the access token 221 to be uploaded into the virtual data storage 220 utilized by the cloud visibility logic 200.

As shown in FIGS. 4A-4B, where the cloud visibility logic 200 has access to valid access tokens for the cloud account 130, the data collection logic 455 may be configured to retrieve the account data 140 (e.g., operational log data) from the virtual storage resources 270. The account data 140 may include information that pertains to an event performed by a customer's cloud-hosted virtual resources (e.g., resources 260 and/or 270), where the "event" corresponds to an operation or a collection of operations conducted by the virtual compute engines 400 that cause a change of state in the cloud infrastructure assigned to that customer.

As an illustrative example, an event may include an API call that is intended to create, modify, or read data, where information 280 associated with the API call may be stored within an entry of an API log being part of the account data 140, such as operational log data, within the assessed cloud account 130 of FIG. 1. The information gathered by the data collection logic 455 from an entry of the API log (i.e., API information 280) may correspond to one type of operational log data 140. Another type of operational log data 140 may be meta-information 290 associated with operations prompted by the API call (e.g., identifier of virtual compute engine(s) utilized, processing time, operating system version utilized, type of operation performed, results of such operations, etc.). The operational log data 140 may further include flow data 285 that includes meta-information associated with interconnectivity between virtual resources or other types of meta-information such as information directed to the customer's cloud account infrastructure.

Referring still to FIG. 4B, the correlation logic 465 is configured to conduct analytics associated with the events recovered as part of the collected data 140 to determine whether any of the events denote either (i) a potential cyberattack is or has been conducted or (ii) one or more account misconfigurations have occurred. The analyses by the correlation logic 465 may be conducted in accordance with a first subset of a plurality of rules 490, which are selected to identify an occurrence of one or more unexpected, abnormal or inconsistent events. The rules 490 may include subsets of rules, where each rule subset controls operations of a specific logic type operating within the cloud visibility logic 200, the data collection logic 455, the visualization logic 460, the correlation logic 465, the reporting (alert generation) logic 470, the remediation logic 475, the update logic 480 and the aggregation logic 485. This control of operation is referred to as a "defined policy" of operation.

The update logic 480 is configured to modify (e.g., add, change, or delete) any of the rules 490, any of the parameters associated with or utilized by the rules 490, and/or functional characteristics of one or more software components forming the cloud visibility logic 200. For example, the update logic 480 may be configured to perform modifications to the software components in a periodic or aperiodic manner based on modified information (e.g., software updates or patches, rule parameter changes, setting changes, etc.) from an external source. The source may include an entity in charge of maintaining the public cloud network $110_1$, a provider of the cloud visibility logic 200, a provider of a software component installed within the cloud visibility logic 200, or the like.

The analyses by the correlation logic 465 may involve a matching of events associated with the collected data 140 with patterns of known malicious or compromising events, which may involve an initial temporal analysis being conducted to order these events based on time of occurrence. Additionally, or in the alternative, the analyses by the correlation logic 465 may involve a comparison of the current snapshot of the state of the cloud account 130 against prior snapshots.

Optionally, when implemented, the virtualization logic 460 is configured to receive a portion of the collected data 140 and generate a visualization of the infrastructure of the cloud-hosted virtual resources allocated for the cloud account 130. The visualized infrastructure may be used to identify certain portions of these cloud-hosted virtual resources that may be compromised or misconfigured based on analyses of the collected data 140 by the correlation logic 465. More specifically, the virtualization logic 460 may highlight or visually enhance display elements associated with the compromised or misconfigured virtual resources to better identify virtual resources that may require a more detailed review as a part of a cybersecurity attack or a part of an account misconfiguration.

After the correlation logic 465 completes the above-described analytics, the reporting logic 470 may control the issuance of the alerts 440 to one or more administrators responsible for managing the customer cloud-hosted resources or one or more administrators of the public cloud network, especially upon detection of a cybersecurity threat. Prior to issuance of the alerts 440, the aggregation logic 485 may be configured to aggregate analytic results produced by the correlation logic 465 with results from another cloud visibility logic. Additionally, or in the alternative, the cloud resource monitoring system 100 may be configured to retrieve and aggregate data (e.g., operational log data) received from cloud accounts residing in different public cloud networks, perform analytics on the aggregated data, and generate a display (dashboard) to visually depict the presence of any potential cybersecurity threats or misconfigurations for any of these cloud accounts Additionally, for compliance with certain cloud policies, upon detection of a potential threat and/or misconfiguration, the remediation logic 475 may initiate actions to remediate the detected threat and/or misconfiguration through blocking, reconfiguring settings, or the like.

Figure 5A:
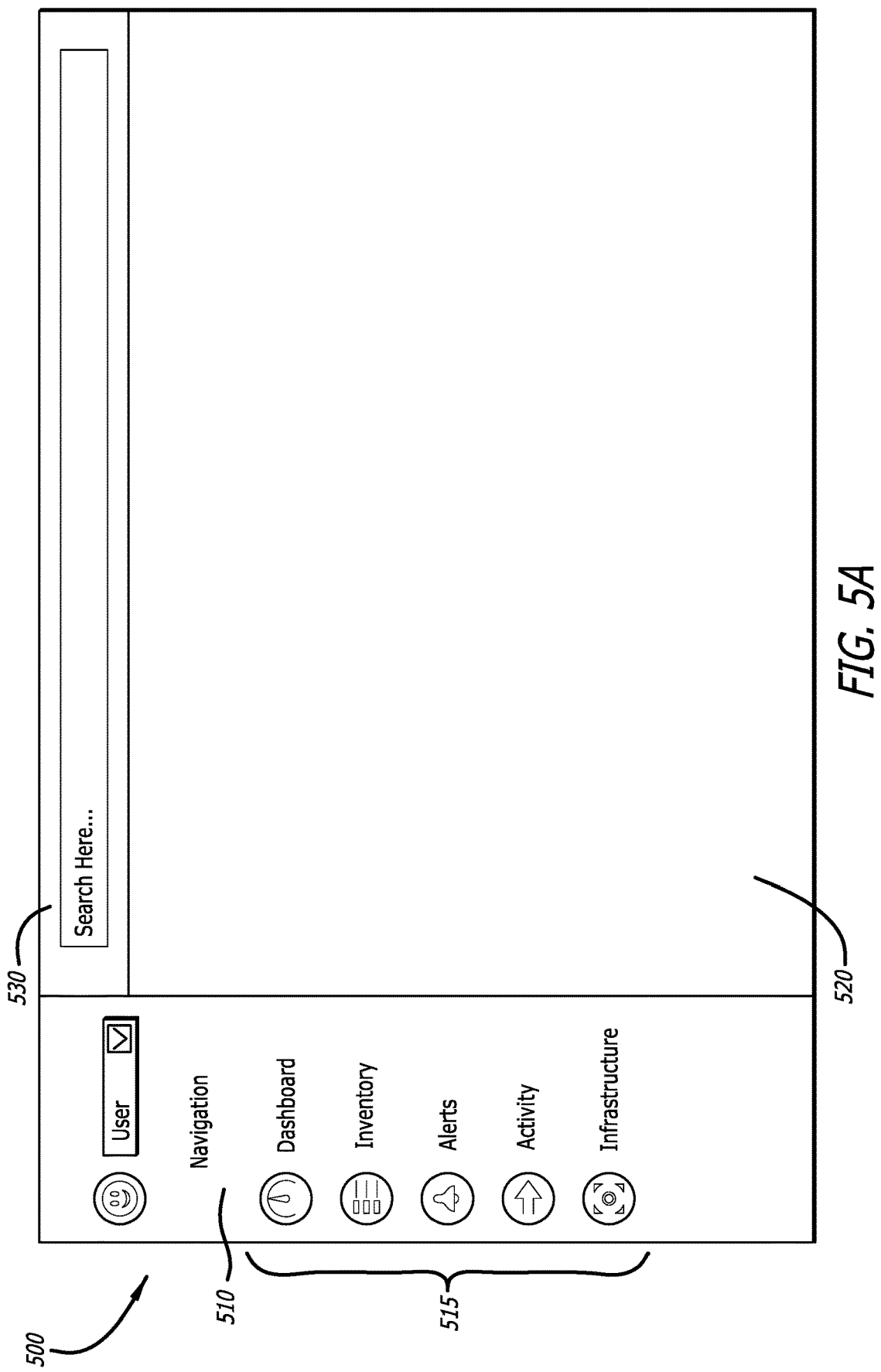
FIG. 5A is an exemplary embodiment of a dashboard generated by the cloud visibility logic to provide collected diagnostic data to a customer administrator relying on cloud account management services.

Referring now to FIG. 5A, an exemplary embodiment of a dashboard 500 generated by the reporting logic 470 of FIG. 4B is shown. The dashboard 500 is configured to support communications with an administrator utilizing cloud account management services provided by cloud resource monitoring system 100. The dashboard 500 includes a navigation window 510, a secondary window 520 and a search window 530. The navigation window 510 includes display elements 515 that, when selected, cause content to be loaded into the secondary window 520.

Figure 5B:
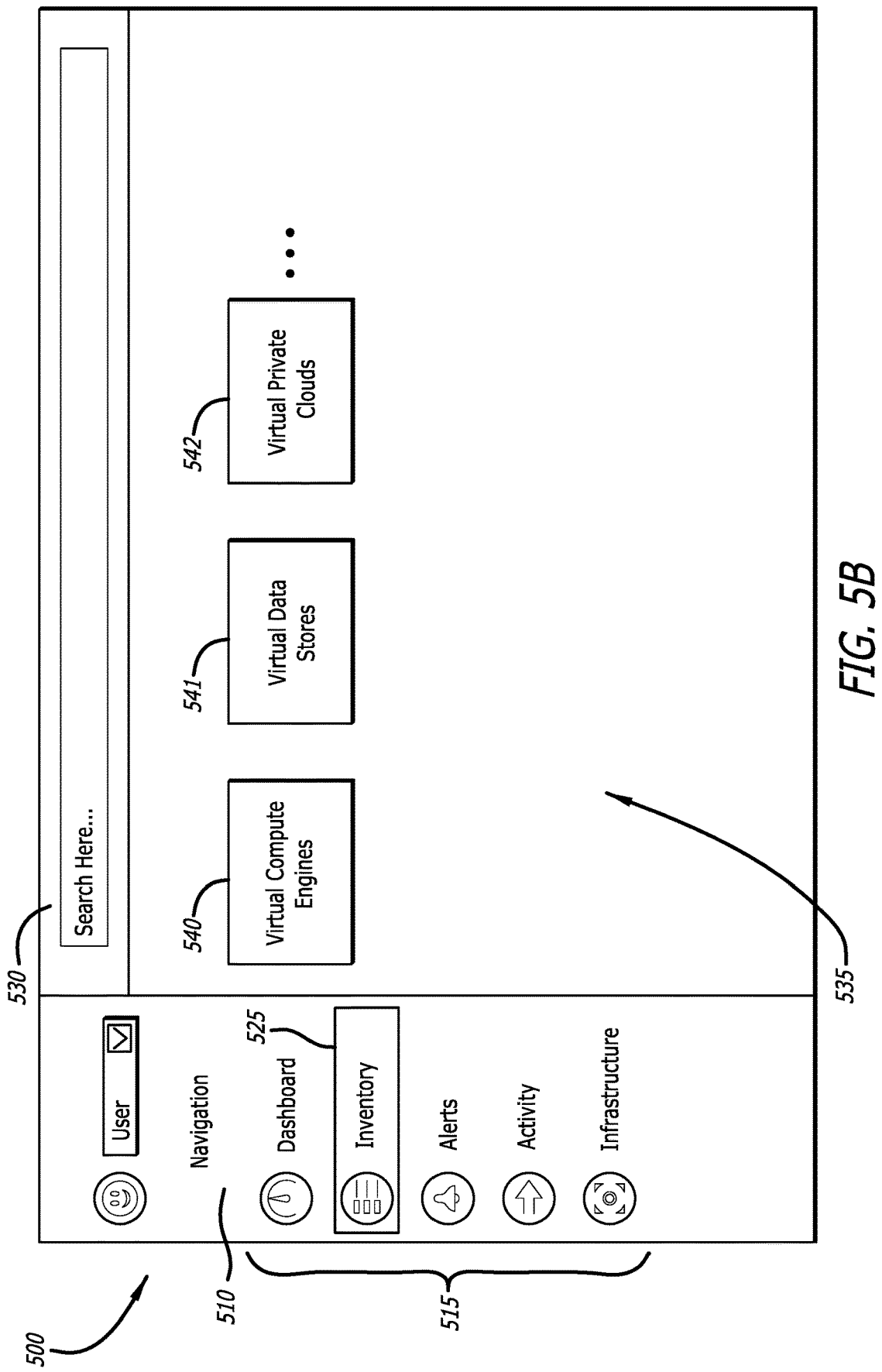
FIG. 5B is an exemplary embodiment of a first navigational tool that is accessible through the dashboard of FIG. 5A and controlled by the cloud visibility logic to generate a display of the inventory of virtual resources utilized by the customer's cloud account.

For example, as shown in FIG. 5B, an exemplary embodiment of a first navigational tool 535 of the dashboard 500 of FIG. 5A is shown. The first navigational tool 535 is activated in response to selection of the "inventory" display element 525 within the navigation window 510. Upon selection of the "inventory" display element 525, the cloud visibility logic 200 of FIG. 5A aggregates groups of different virtual resources (e.g., virtual compute engines 540, virtual data stores 541, virtual private clouds 542, etc.) and generates resource display elements 540-542 to represent these virtual resources. For instance, as shown, a first resource display element 540 may be directed to identifying a number of virtual compute engines being allocated to the cloud account 130 of FIGS. 1, 2 and 4A. Upon further selection of the first resource display element 540, a listing of each of the virtual compute engines and its properties (e.g., name, processing capability, etc.) may be generated for display.

Additionally, a second display element 541 may be directed to identifying a number of virtual data stores being allocated for and utilized by the cloud account 130. Upon further selection of the second display element 541, a listing of each of the virtual data store and its characteristics (e.g., name, storage capacity, unused storage capacity, etc.) may be generated for display as an overlaying window for example. Also, a third display element 542 may be directed to identifying a number of virtual private clouds (VPCs) utilized by the cloud account 130. Upon selection of the third display element 542, a listing of each the virtual private clouds and its properties (e.g., name, IP address, etc.) may be generated for display.

Figure 5C:
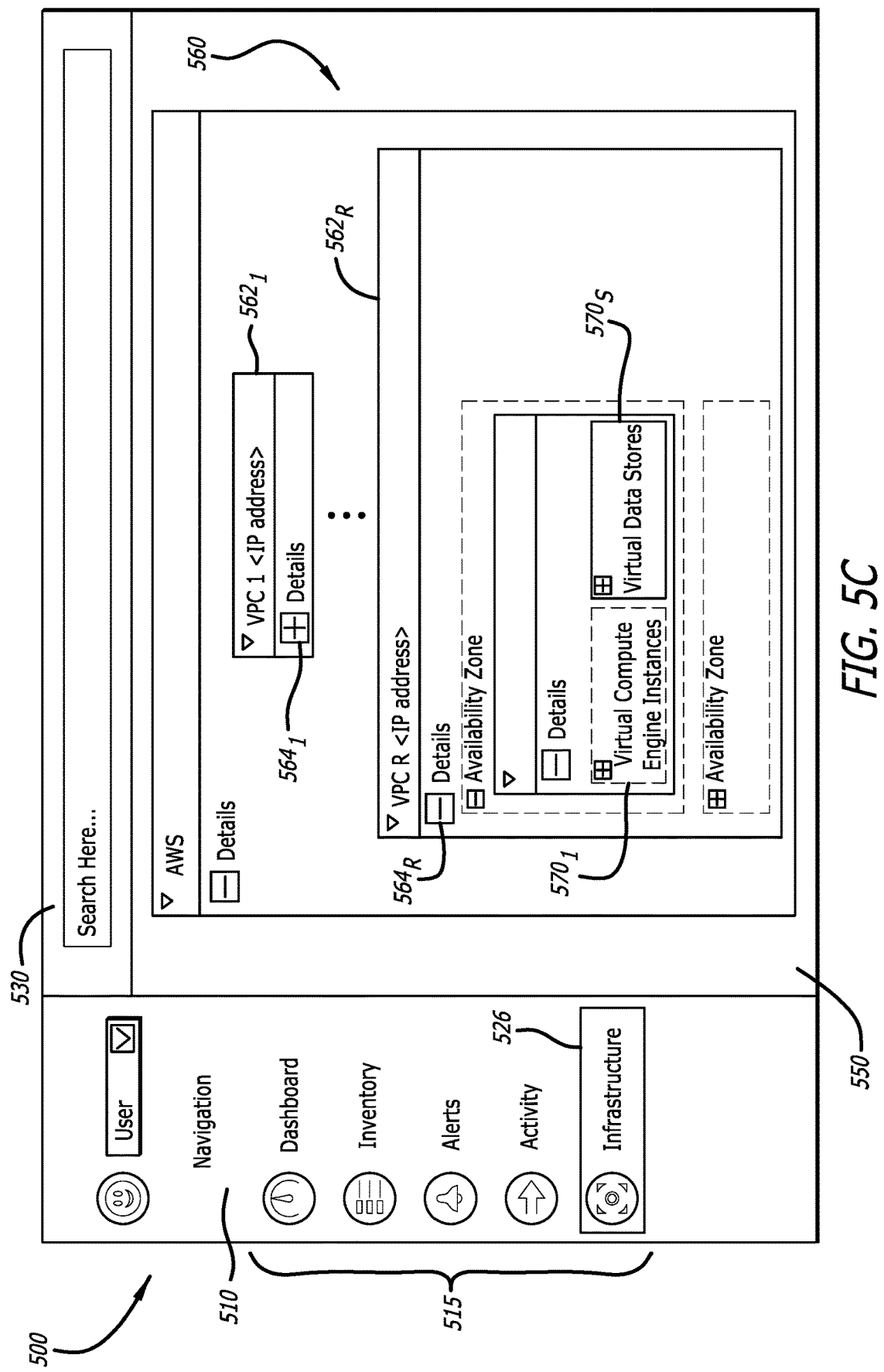
FIG. 5C is an exemplary embodiment of a second navigational tool that is accessible through the dashboard of FIG. 5A and controlled by the cloud visibility logic to generate a display of the resource infrastructure for the customer's cloud account.

Referring now to FIG. 5C, an exemplary embodiment of a second navigational tool 550 of the dashboard 500 of FIG. 5A is shown. Upon selection of an "infrastructure" display element 526, the cloud visibility logic 200 is configured to generate a display 560. The display 560 features a plurality of display elements $562_1$-$562_R$ (R>1), where the display elements $562_1$-$562_R$ correspond to virtual resources formulating an infrastructure of the cloud account 130. Some or all of these display elements $562_1$-$562_R$ may be implemented as nested display elements that are visible upon selection of the "details" icons $564_1$-$564_R$. For instance, a first display element $562_1$ may represent a virtual private cloud (VPC) identifying the name of the VPC and its Internet Protocol (IP) address. However, upon selection of the details icon $564_R$ of the display element $562_R$, one or more display sub-elements $570_1$-$570_S$ (S≥1) are rendered, each representing a particular zone within the VPC or one or more particular virtual resources (e.g., virtual compute engines, virtual data stores, etc.) within that VPC. As described below, each display sub-elements $570_1$-$570_S$ provides a selectable icon to obtain further information associated with each of the virtual resources.

Figure 5D:
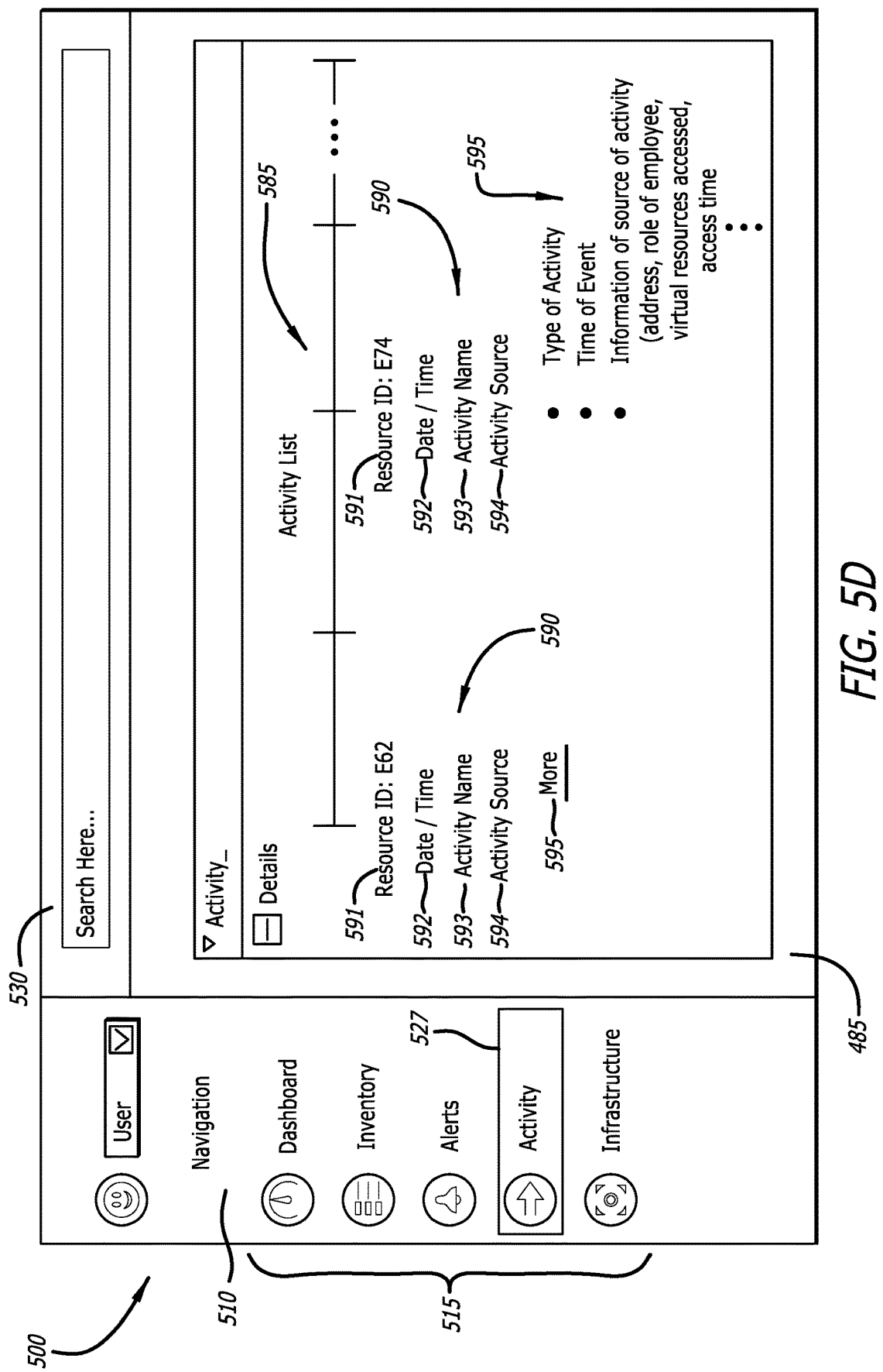
FIG. 5D is an exemplary embodiment of a third navigational tool that is accessible through the dashboard of FIG. 5A and generated by the cloud visibility logic to provide a listing of malicious or compromising events conducted by virtual resources within the customer's cloud account.

Referring now to FIG. 5D, an exemplary embodiment of a third navigational tool 580 of the dashboard 500 of FIG. 5A is shown. Upon selecting an "activity" display element 527, the reporting logic 470 is configured to generate a display including a timeline 585 of events 590 conducted by virtual resources within the customer's cloud account 130 that are determined to be a "malicious" event; namely an event associated with a cyberattack or an account misconfiguration. The timeline 585 provides a chronological sequence of the malicious or compromising events and allows for retrospective review of events based on any of a plurality of criterion such as a date/time range, event (activity) type, particular virtual resource represented by resource identifier, source, or the like.

As shown, each of these malicious or compromising events 590 identified on the timeline may include an identifier of a virtual resource 591, date/time of detection 592, a name 593 of a detected activity associated with the virtual resource, an identifier 594 of an original source of content that causes the occurrence of the "malicious" event, or the like. Herein, the event timeline 590 may provide guidance for conducting an in-depth analysis of the cause of the malicious or compromising event by selection of the "more" data display element 595 that, when selected, provides for display additional details surrounding the activity (e.g., activity type, additional source details, etc.) as shown herein.

Figure 6:
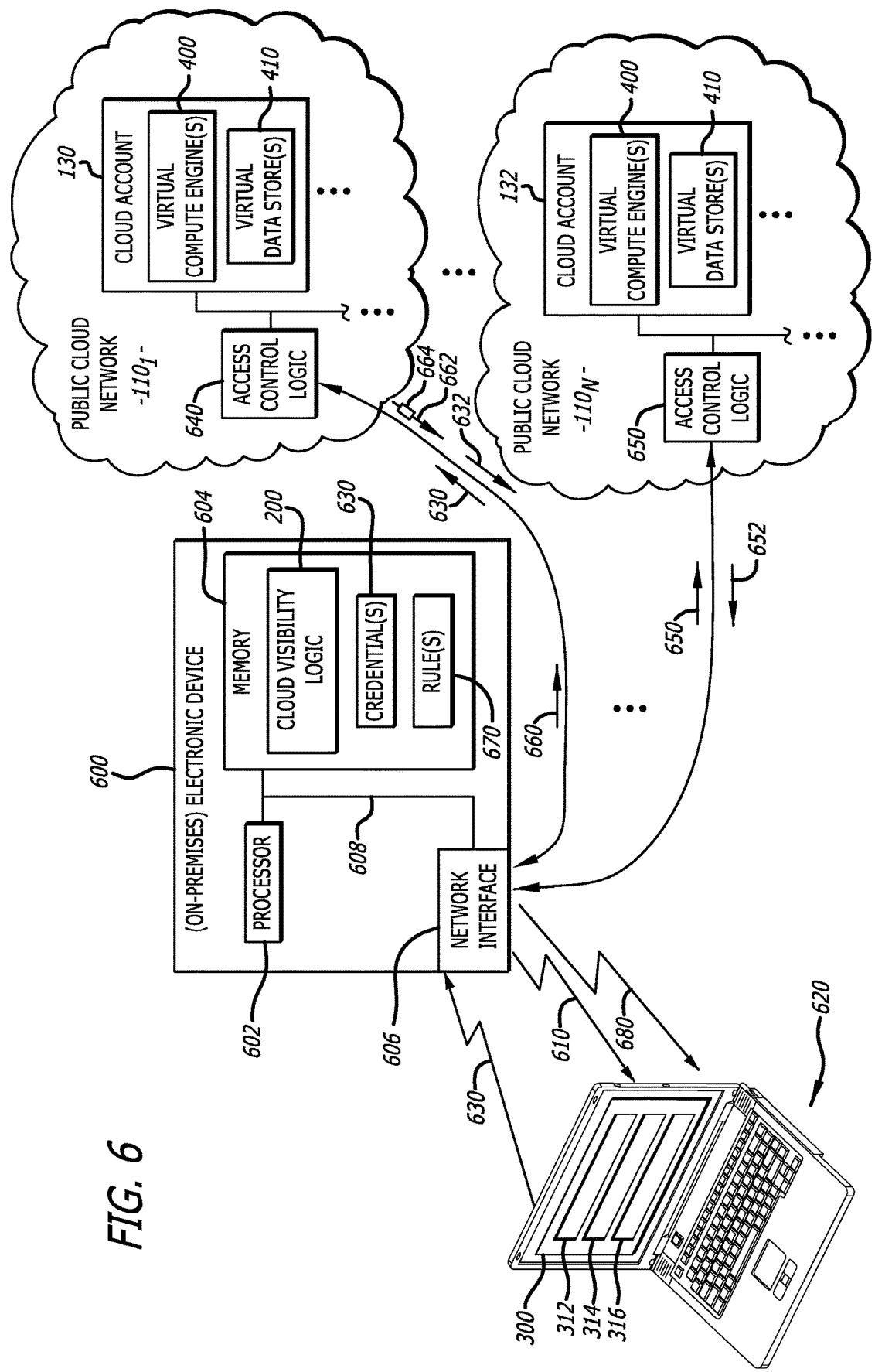
FIG. 6 is an exemplary embodiment of resources associated with the first public cloud network of FIG. 1 including the cloud visibility logic installed within an on-premises electronic device that is configured to access and retrieve specific customer account information for analysis within the on-premises electronic device.

Referring to FIG. 6, an exemplary embodiment of a hosted service (on-premises) deployment for the cloud visibility logic 200, which is installed within an on-premises electronic device 600 configured to access and retrieve meta-information, including operational log data, from user account information for on-premises analysis is shown. The electronic device 600 includes a hardware processor 602, storage medium (e.g., memory) 604 and a network interface 606, which are communicatively coupled together via one or more transmission mediums 608, for establishing and maintaining communications with the public cloud network $110_1$. The cloud visibility logic 200 is deployed within the memory 604 and executed by the processor 602.

Herein, as described above, the cloud visibility logic 200 may be configured to gain authorized access to the customer's cloud account 130 in the first public cloud network $110_1$ using a selected authentication scheme. Similar to the cloud-based hosted service operations illustrated in FIG. 2, the cloud visibility logic 200 may transmit a permission request message 610 from the electronic device 600 to an endpoint device 620 if the cloud visibility logic 200 determines that its stored access tokens for use in gaining authorized access to stored content within the cloud account 130 residing in the first public cloud network $110_1$ or the cloud account 132 residing in the $N^{th}$ public cloud network $110_N$ are invalid. The endpoint device 620 is an electronic device utilized by the customer to which the cloud accounts 130 and 132 pertain.

As a first illustrative authentication scheme, upon receipt of the permission request message 610, the Web UI portal 300 is launched for display by the endpoint device 620. As set forth in FIG. 3, as described above, the first entry 312 may be reserved to receive an identifier for the cloud account 130 (e.g., account name, alias, etc.). Other entries 314 and 316 may include key(s) or another type of credential and/or virtual resource identifier, respectively. The contents of the Web UI portal 300 are collected and, based on these contents, a first customer credential 630 is provided to the cloud visibility logic 200 within the electronic device 600. The cloud visibility logic 200 may forward the first customer credential 630 to access control logic 640 within the public cloud network $110_1$, which analyzes the first customer credential 630, and upon authentication, returns an access token 632 upon determination that the customer is permitted access to the cloud account 130 via the cloud visibility logic 200.

Alternatively, as a second illustrative example, the authentication scheme to securing an access token 652 may be conducted by the cloud visibility logic 200 through an OAuth 2.0 Authorization Framework or a similar framework. For example, the cloud visibility logic 200 may be registered by an authorized administrator as logic permitted to operate as an agent for a customer in gaining access to stored data within the cloud account 132. During registration, in response to the permission request message 610, an administrator for the cloud visibility logic 200 may provide a second customer credential 650 (e.g., one or more network addresses), which may be different from the first customer credential 630 given communications are directed to a different type of public cloud network, for accessing stored content within the cloud account 132. Upon registration, based on the second customer credential 650, an access control logic 654 (residing in the public cloud network $110_N$) may return a result of an authentication of the customer credential (Success/Failure) and the access token 652 assigned to the customer for use in accessing the cloud account 130 for a prescribed period of time or until the token 652 is revoked.

Once a valid access token is available to the cloud visibility logic 200 (e.g., access token 632), the cloud visibility logic 200 may issue a communication session to access stored content within the cloud account 130. The communication session may include a scan request message 660, which includes the access token 632 and seeks authorization to access the stored content with the cloud account 130 in order to perform analytics to identify whether the cloud account 130 has been potentially compromised. The cloud visibility logic 200 may receive a returned response 662 to the scan request message 660, which may include meta-information 664, such as operational log data associated with the accessed cloud account 130. The meta-information 664 may be directed to software components forming an infrastructure of the access cloud account 130, such as information directed to the virtual compute engines 400 and/or virtual data stores 410 allocated to the customer's cloud account 130. Additionally, or in the alternative, the meta-information 664 may be associated with events acquired and/or generated through processing operations conducted by the virtual compute engines 400 allocated to the customer's cloud account 130.

In general, the meta-information 664 may be content associated with an operation or a collection of operations conducted by the virtual resources that represent an attempted change of state in the cloud account 130 or properties associated with virtual resource, or more restrictive as content directed to events that pertain to an operation or a collection of operations conducted by the virtual resources that is unexpected, abnormal or inconsistent with typical operations within the cloud account 130. Specifically, the events may include queries to permission restricted data stores to obtain sensitive information disability or enabling certain operability (e.g., encryption, change ciphers, etc.). Additionally, the events may include attempted accesses to cloud accounts in the same or other public cloud networks such as attempts to access the cloud account 132 residing in the public cloud network $110_N$.

The cloud visibility logic 200 may perform analytics on the collected meta-information 664 to detect a cybersecurity threat and/or cloud account misconfiguration. According to one embodiment of the disclosure, the analytics may involve one or more analyses on a portion or portions of the meta-information 664 in accordance with a plurality of rules 670 that are configured to identify an occurrence of unexpected, abnormal or inconsistent events. As described above and illustrated in FIG. 5B, the rules 670 may be modified by update logic within the cloud visibility logic 200. Also, the analyses may involve a matching of events included as part of the meta-information 664 with patterns of known malicious or compromising events, or a comparison of the current snapshot of the state of the cloud account 130 against the prior snapshots in order to identify differences and concentrate subsequent analyses of these differences. For either or both of these analyses, the cloud visibility logic 200 operates to determine potential issues, such as cybersecurity threats or misconfigurations that may be causing the virtual resources for an account to operate incorrectly, inconsistently, or in a less than optimal manner.

If cybersecurity threat or account misconfiguration is detected by the cloud visibility logic 200, an alert 680 may be generated by the cloud visibility logic 200 within the on-premises electronic device 600 for issuance to one or more administrators. The alert 680 may include information associated with the analytics, where these analytic results may be rendered in a display format to represent the particular events that led to the cybersecurity threat or account misconfiguration. Additionally, the alert 680 may include a prescribed mitigation scheme to remediate the cybersecurity threat or account misconfiguration, which is in compliance with any regulatory requirements.

Although not shown in detail, the cloud visibility logic 200, with access to the valid access token 652, may issue a communication session to access stored content within the cloud account 132 in order to gain access to stored content (e.g., operational log data, meta-information, etc.) with the cloud account 132 in order to perform analytics to identify whether the cloud account 132 has been potentially compromised as well. The cloud visibility logic 200 provides a centralized analytic and alert scheme to allow administrator or analyst to review the security status of cloud resources for a customer, whether these cloud resources pertain to a single cloud account, multiple cloud accounts within the same public cloud network or multiple cloud accounts within different public cloud networks, a combination of cloud resources within cloud account(s) and resources within an enterprise network to which the electronic device 600 is connected. This review may be provided via the same dashboards as shown in FIGS. 5A-5D thereby providing a "single pane" security visibility across enterprise and cloud infrastructures.

Figure 7:
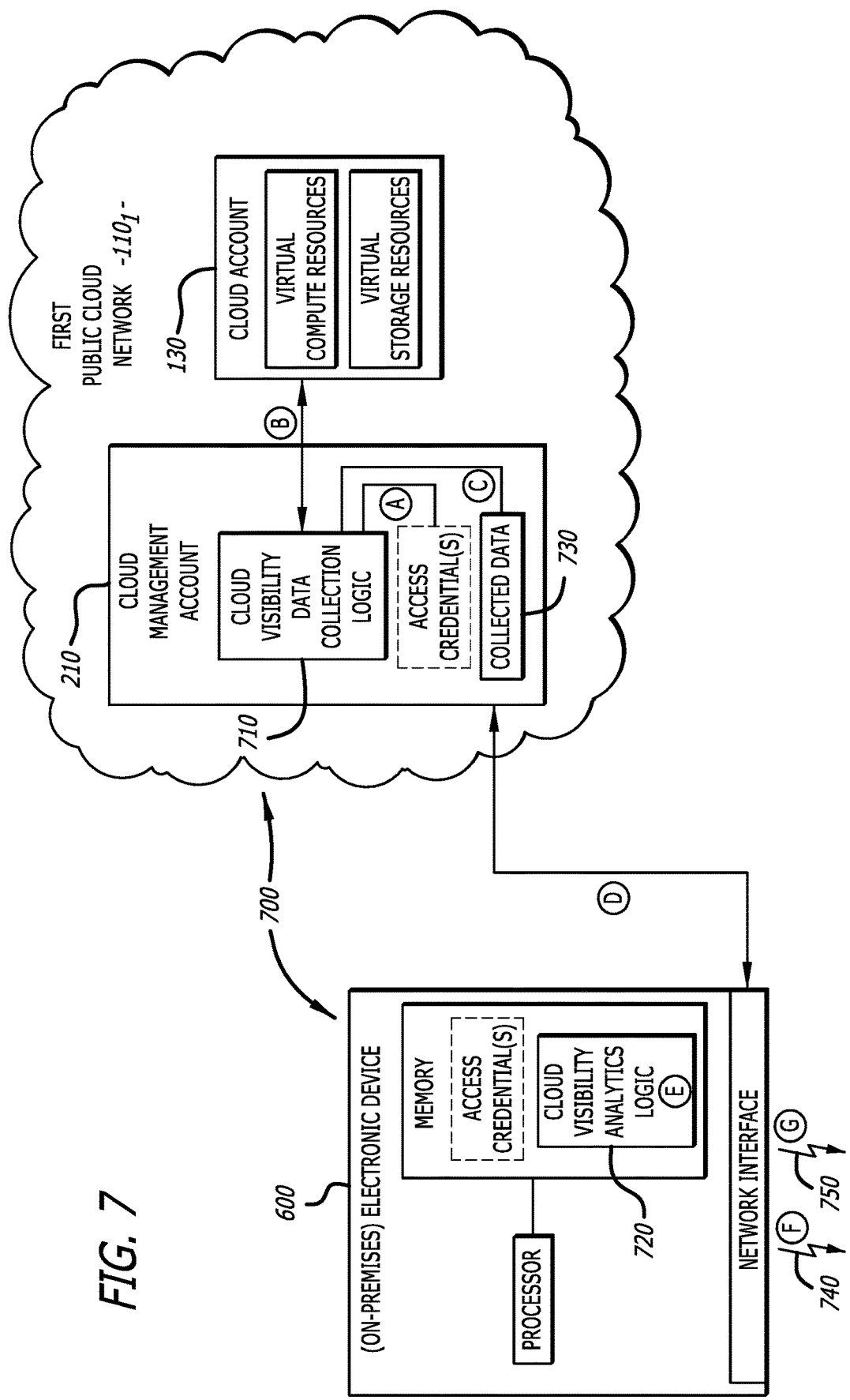
FIG. 7 is an exemplary embodiment of resources associated with the first public cloud network of FIG. 1 illustrating operations conducted by a hybrid cloud management system including cloud visibility data collection logic maintained at the public cloud network and cloud visibility analytic logic maintained at an on-premises electronic device.

Referring now to FIG. 7, an exemplary embodiment of a hybrid cloud management system 700 including cloud visibility data collection logic 710 maintained at the first public cloud network 110₁ and cloud visibility analytic logic 720 maintained at an on-premises electronic device 600. As shown, cloud visibility data collection logic 710 may be configured to (i) gain authorized access to resources within the customer's cloud account 130 (operations A & B), and once authorized access is secured, (ii) collect data 730 (operation C), including meta-information such as operational log data associated with the cloud account 130. As shown, the cloud visibility data collection logic 710 is installed as a resource within the cloud account 130 so that access tokens are secured and maintained therein. Of course, the cloud visibility data collection logic 710 may be installed within the cloud resource monitoring service 210, and if so, the cloud visibility data collection logic 710 would secure the access tokens for the cloud account 130 and receive the collected data 730 therefrom.

The cloud visibility analytic logic 720 processes and analyses the collected data 730 returned from the cloud visibility data collection logic 710 (operation D). The processes and analyses conducted by the cloud visibility analytic logic 720 involve the generation a graphical representation 740 to visualize an infrastructure of the cloud account 130 based on the collected data 730 (operations E&F) and the performance of analytics on the collected data 730 to determine a presence of any threats or misconfigurations. Based on these analytics, the cloud visibility analytic logic 720 may generate alerts 750 that are made available to one or more administrators of the analytic results (operation G). The alerts 750 may include messages with the analytic results and/or information for use in performing remediation activities, as described above.

V. Operational Flow—Cloud Management System

Figure 8:
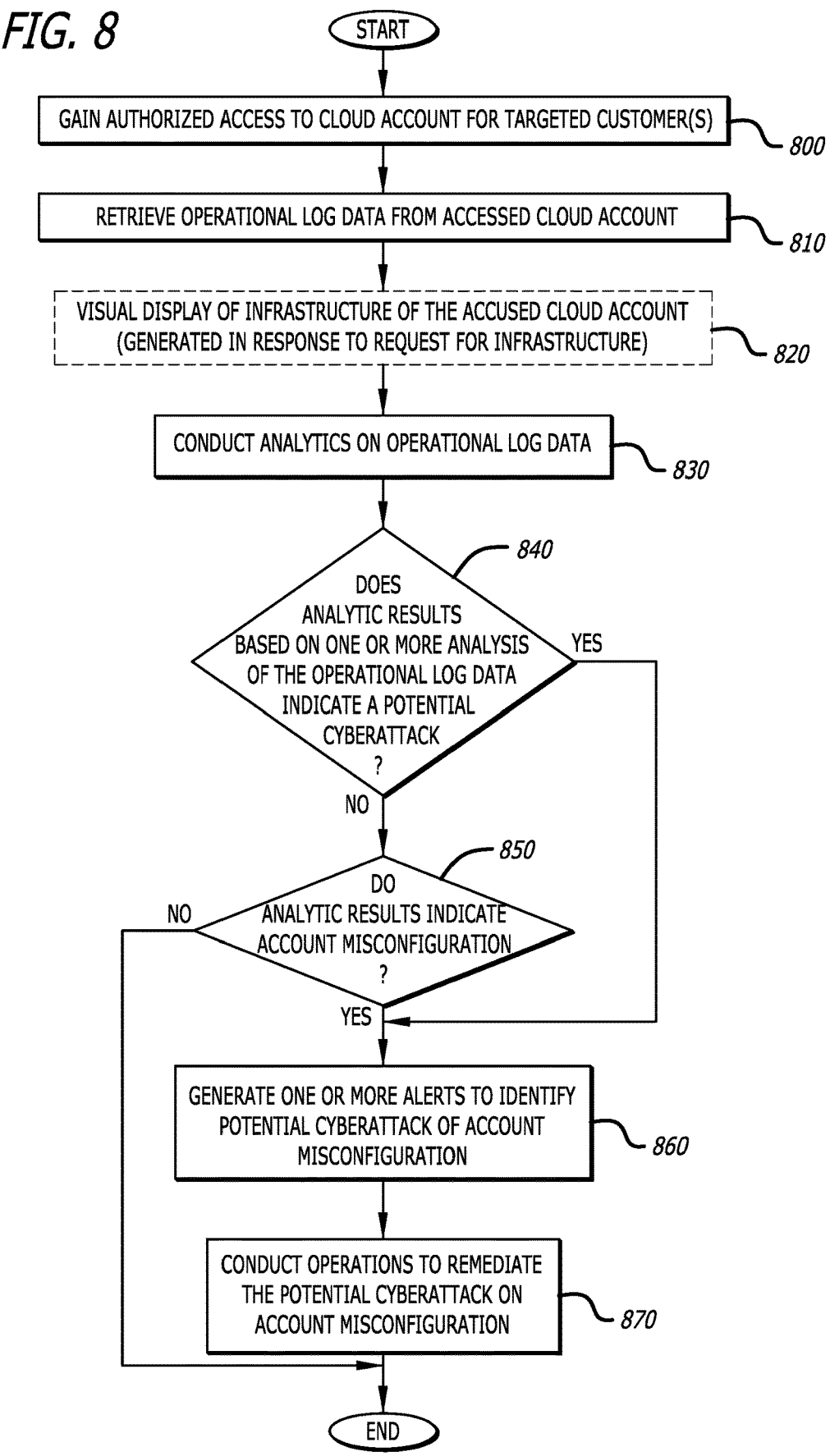
FIG. 8 is an exemplary flowchart of the operations conducted by the cloud resource monitoring system.

Referring now to FIG. 8, an exemplary flowchart of the operations conducted by the cloud resource monitoring system 100 is shown. Initially, authorized access to a cloud account for a targeted customer is requested and secured (block 800). From the accessed cloud account, operational log data is retrieved (block 810). The operational log data may include meta-information associated with events each corresponding to an operation or a collection of operations conducted by the virtual resources within the cloud account that cause a change of state in the infrastructure of the cloud account. For example, the operational log data may include content stored within an entry of an API call that is directed to an API call intended to create, modify, or read data. The data within an entry of the API log is one type of operational log data. Other examples of an event may include recorded characteristics and/or operability of a virtual resource such as a virtual compute engine or virtual data store, or the like. Examples of recorded operability may include a critical action such as disabling a security service, disabling encryption on stored data resources.

As an optional operation, based on the operational log data, a visual display of an infrastructure of the cloud account may be generated (block 820). According to one embodiment, the visual display may include a plurality of display elements corresponding to the virtual resources formulating the cloud account, where the positioning of these display elements (or generation of connectors between these display elements) identify relationships between the virtual resources. For changes in infrastructure that are unexpected, abnormal or inconsistent events, the display elements (or connectors) may be highlighted to identify an attempted cyberattack or account misconfiguration.

Thereafter, analytics are conducted on the recovered operational log data to determine whether a cyberattack has or is being attempted or a misconfiguration of the cloud account has occurred (blocks 830-850). When the analytic results identify that a cyberattack has or is being attempted on resources allocated to the cloud account and/or the cloud account has been misconfigured (e.g., unexpected setting change in the cloud account, abnormal setting, events occurring that are inconsistent with known (expected) patterns of events, etc.), one or more alerts may be generated and provided to administrators for the customer that is associated with the cloud account (block 860). The alerts may include a portion of the analytic results that are used in identifying the attempted cyberattack and/or account misconfiguration along with context information associated with the attempted cyberattack and/or account misconfiguration. Included as part of the alert, information directed to the remediation of the attempted cyberattack and/or account misconfiguration in compliance with any regulatory rules is provided (block 870).

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A non-transitory storage medium including software configured to protect public cloud-hosted virtual resources, comprising:
   credential evaluation logic configured to gain authorized access to a cloud account within a first public cloud network based at least on submission of a valid access token obtained by the software to logic that controls access to account data within the cloud account;
   data collection logic configured to retrieve the account data from the cloud account;
   correlation logic configured to conduct analytics on the account data to determine whether the cloud account is subject to a cybersecurity threat or misconfiguration; and
   reporting logic configured to generate an alert when the cloud account is determined to be subject to the cybersecurity threat or misconfiguration.

2. The non-transitory storage medium of claim 1, wherein the credential evaluation logic is configured to select an authentication operation to be performed to obtain the valid access token.

3. The non-transitory storage medium of claim 1, wherein the credential evaluation logic to obtain the valid access token by generating for display a web user interface portal to receive as input information that, upon authenticated, prompts return of the valid access token.

4. The non-transitory storage medium of claim 1, wherein at least the credential evaluation logic and the data collection logic operate based on execution by a virtual compute engine instance.

5. The non-transitory storage medium of claim 1, wherein the account data includes operational log data pertaining to one or more events performed by the public cloud-hosted virtual resources that cause a change of state in an infrastructure of the cloud account.

6. The non-transitory storage medium of claim 5, wherein the operational log data include meta-information associated with one or more Application Programming Interface (API) calls stored within an API log.

7. The non-transitory storage medium of claim 1 further comprising:
   visualization logic configured to receive a portion of the account data including data associated with an infrastructure of the cloud account and generate a visualization of the cloud account including public cloud-hosted virtual resources forming the infrastructure of the cloud account.

8. The non-transitory storage medium of claim 7, wherein the visualization logic to highlight or visually enhance one or more display elements of the virtualization of the infrastructure of the cloud account that correspond to potentially compromised or misconfigured public cloud-hosted virtual resources of the public cloud-hosted virtual resources.

9. The non-transitory storage medium of claim 1 further comprising:
   remediation logic to initiate one or more actions to remediate the cybersecurity threat to or misconfiguration of the cloud account, the one or more actions include reverting a policy of operation for one or more of the public cloud-hosted virtual resources utilized by the cloud account to a default or predetermined configuration, the policy of operation being established through one or more settings or rules.

10. A computerized method, comprising:
    gaining authorized access to a cloud account within a first public cloud network based at least on submission of a valid access token obtained by logic that controls access to account data within the cloud account;
    retrieving the account data from the cloud account;
    conducting analytics on the account data to determine whether the cloud account is subject to a cybersecurity threat or misconfiguration; and
    generating an alert when the cloud account is determined to be subject to the cybersecurity threat or misconfiguration.

11. The computerized method of claim 10, wherein the gaining of authorized access to the cloud account comprises selecting an authentication operation to be performed to obtain the valid access token.

12. The computerized method of claim 10, wherein the gaining of authorized access to the cloud account comprises obtaining the valid access token by at least generating for display a web user interface portal to receive as input information that, upon authenticated, prompts return of the valid access token.

13. The computerized method of claim 10, wherein the account data includes operational log data pertaining to one or more events performed by public cloud-hosted virtual resources that cause a change of state in an infrastructure of the cloud account.

14. The computerized method of claim 13, wherein the operational log data include meta-information associated with one or more Application Programming Interface (API) calls stored within an API log.

15. The computerized method of claim 10 further comprising:
    receiving a portion of the account data including data associated with an infrastructure of the cloud account; and
    generating a visualization of the cloud account including public cloud-hosted virtual resources forming the infrastructure of the cloud account.

16. The computerized method of claim 15, wherein the generating of the visualization includes highlighting or visually enhancing one or more display elements of the virtualization of the infrastructure of the cloud account that correspond to potentially compromised or misconfigured public cloud-hosted virtual resources of the public cloud-hosted virtual resources.

17. The computerized method of claim 10 further comprising:
    initiating one or more actions to remediate the cybersecurity threat to or misconfiguration of the cloud account, the one or more actions include reverting a policy of operation for one or more of public cloud-hosted virtual resources utilized by the cloud account to a default or predetermined configuration, the policy of operation being established through one or more settings or rules.

18. A cloud resource monitoring system, comprising:
    one or more virtual compute engines; and
    a non-transitory storage medium including logic executed by the one or more virtual compute engines, the logic comprises credential evaluation logic configured to gain authorized access to a cloud account within a first public cloud network based at least on submission of a valid access token obtained by the software to logic that controls access to account data within the cloud account, data collection logic configured to retrieve the account data from the cloud account, and correlation logic configured to conduct analytics on the account data to determine whether the cloud account is subject to a cybersecurity threat or misconfiguration.

19. The cloud resource monitoring system of claim 18, wherein the non-transitory storage medium further comprises reporting logic configured to generate an alert when the cloud account is determined to be subject to the cybersecurity threat or misconfiguration.

20. The cloud resource monitoring system of claim 18, wherein the non-transitory storage medium further comprises visualization logic configured to receive a portion of the account data including data associated with an infrastructure of the cloud account and generate a visualization of the cloud account including public cloud-hosted virtual resources forming the infrastructure of the cloud account.

21. The cloud resource monitoring system of claim 20, wherein the visualization logic to highlight or visually enhance one or more display elements of the virtualization of the infrastructure of the cloud account that correspond to potentially compromised or misconfigured public cloud-hosted virtual resources of the public cloud-hosted virtual resources.

22. The cloud resource monitoring system of claim 18, wherein the non-transitory storage medium further comprises remediation logic to initiate one or more actions to remediate the cybersecurity threat to or misconfiguration of the cloud account, the one or more actions include reverting a policy of operation for one or more of the public cloud-hosted virtual resources utilized by the cloud account to a default or predetermined configuration, the policy of operation being established through one or more settings or rules.

* * * * *